US012188887B2

(12) United States Patent
 Smith

(10) Patent No.: US 12,188,887 B2
(45) Date of Patent: Jan. 7, 2025

(54) MATERIAL PROPERTY TESTING SYSTEM AND METHOD

(71) Applicant: Innogized Technologies, Inc., Cleveland, OH (US)

(72) Inventor: Oliver Smith, Chesterland, OH (US)

(73) Assignee: Innogized Technologies, Inc., Cleveland, OH (US)

( * ) Notice: Subject to any disclaimer, the term of this patent is extended or adjusted under 35 U.S.C. 154(b) by 849 days.

(21) Appl. No.: 17/289,348

(22) PCT Filed: Oct. 31, 2019

(86) PCT No.: PCT/US2019/059074
§ 371 (c)(1),
(2) Date: Apr. 28, 2021

(87) PCT Pub. No.: WO2020/092713
PCT Pub. Date: May 7, 2020

(65) Prior Publication Data
US 2021/0396694 A1    Dec. 23, 2021

Related U.S. Application Data

(60) Provisional application No. 62/861,341, filed on Jun. 14, 2019, provisional application No. 62/754,671, filed on Nov. 2, 2018.

(51) Int. Cl.
 *G01N 25/18*  (2006.01)
 *G01B 7/06*  (2006.01)
 (Continued)

(52) U.S. Cl.
 CPC .............. *G01N 25/18* (2013.01); *G01B 7/06* (2013.01); *G01N 21/00* (2013.01); *G01N 29/04* (2013.01);
 (Continued)

(58) Field of Classification Search
 CPC ........ G01N 25/18; G01N 29/04; G01N 3/307; G01N 3/42; G01N 2291/02827; G01N 2291/02854; G01B 7/06
 See application file for complete search history.

(56) References Cited

U.S. PATENT DOCUMENTS

2003/0101008 A1    5/2003  Mansky
2009/0252199 A1*  10/2009  Liu ...................... G01K 1/146
                                              374/E1.001
(Continued)

FOREIGN PATENT DOCUMENTS

EP    1065488 A1     1/2001
GB    2287790 A  *  9/1995  ............... G01B 5/28
IN    201611014157 A  10/2017

OTHER PUBLICATIONS

PCT Search Report dated Mar. 3, 2020 in connection with PCT Application No. PCT/US2019/059074.
ATSM International; "Standard Test Method for Thermal Resistance of Batting Systems Using a Hot Plate"; Designation D1518-14; Nov. 29, 2018.
(Continued)

*Primary Examiner* — Mirellys Jagan
(74) *Attorney, Agent, or Firm* — Eschweiler & Potashnik, LLC

(57) ABSTRACT

Systems, methods, devices, and circuitries are provided for determining a material property. In one embodiment, a method includes applying non-thermal energy to a first side of a material sample; sensing, a response of the material sample to the non-thermal energy; generating non-thermal data indicative of the response; and determining a thermal property of the material sample based on the non-thermal data. In one embodiment, the method also includes determining an environmental characteristic; determining a suitability of the material sample based on the thermal property and the environmental characteristic; and displaying information related to the suitability.

20 Claims, 21 Drawing Sheets

(51) Int. Cl.
*G01N 3/307* (2006.01)
*G01N 3/42* (2006.01)
*G01N 21/00* (2006.01)
*G01N 29/04* (2006.01)
*G01N 21/31* (2006.01)

(52) U.S. Cl.
CPC .............. *G01N 3/307* (2013.01); *G01N 3/42* (2013.01); *G01N 21/31* (2013.01); *G01N 2291/02827* (2013.01); *G01N 2291/02854* (2013.01)

(56) References Cited

U.S. PATENT DOCUMENTS

| | | |
|---|---|---|
| 2011/0303022 A1 | 12/2011 | Hansma |
| 2014/0247062 A1 | 9/2014 | Balthes |
| 2018/0080888 A1 | 3/2018 | Nazarian |
| 2018/0144227 A1 | 5/2018 | Jesme |
| 2019/0369038 A1* | 12/2019 | Tada .................... G01N 25/18 |
| 2020/0064287 A1* | 2/2020 | Mori .................... G01N 25/18 |

OTHER PUBLICATIONS

ATSM International; "Standard Test Method for Thickness of Textile Materials"; Designation; D1777-96 (Reapproved 2015); Apr. 12, 2019.
Hot Disk AB; "Hot Disk Thermal Conductivity Meter"; Hot Disk AB, Gothenburg Sweden; 2019.
C-Therm Technologies; "Modified Transient Plane Source (MTPS): Theory of Operation".
Linesis Thermal Analytics; "Laser Flash Analysis"; Feb. 2019.
Potirakis, S.M.; "Acoustics and sound absorption issues applied in textile problems"; Electronics and Computing in Textiles; Chapter 4; Department of Electronics Engineering, Technological Education Institute of Piraeus, Greece; 2012.
Saleem, Aamer et al.; "New Infrared Transmission through Various Clothing Fabrics" School of Engineering, University of Warwick; vol. 3, Issue 2; 2013.
International Preliminary Report on Patentability dated Apr. 27, 2021 in connection with PCT Application No. PCT/US2019/059074.
Hot Disk AB; "Hot Disk TPS 500 S"; Hot Disk AB, Gothenburg Sweden; Product Flyer.

* cited by examiner

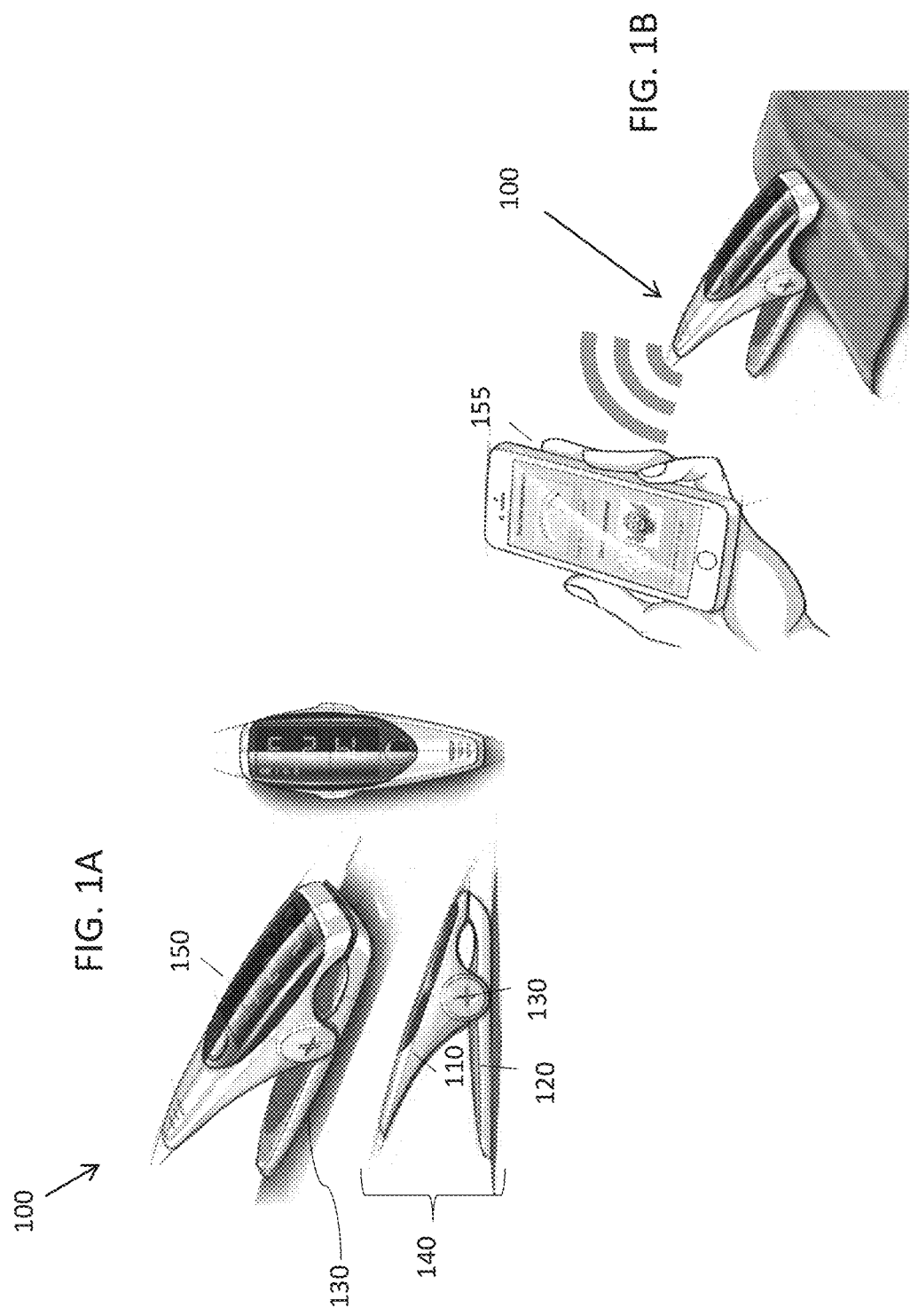

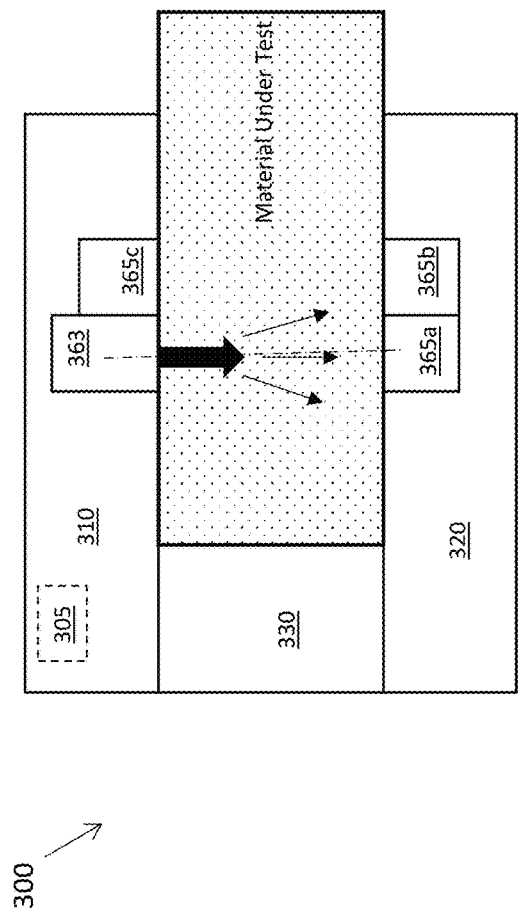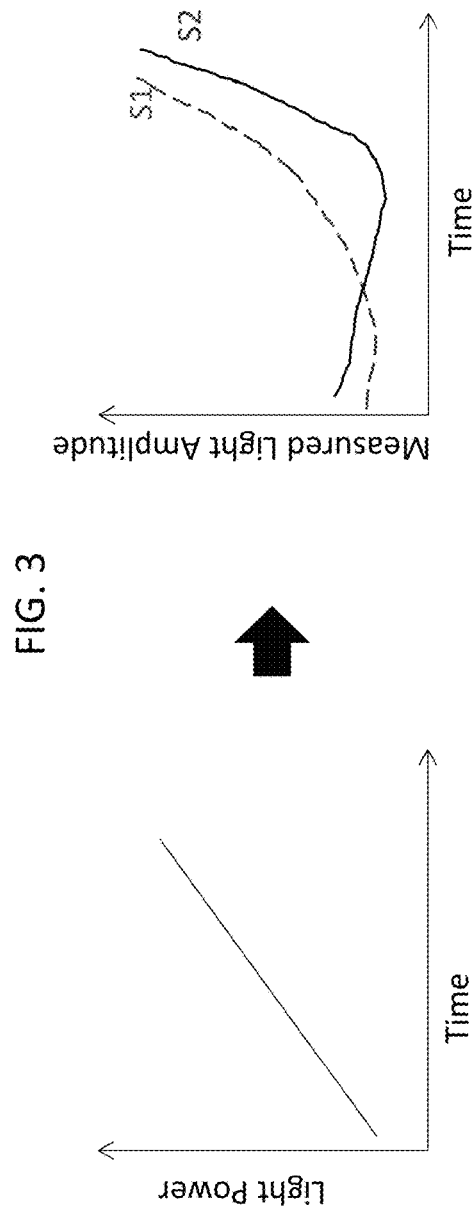
FIG. 3
FIG. 3A
FIG. 3B

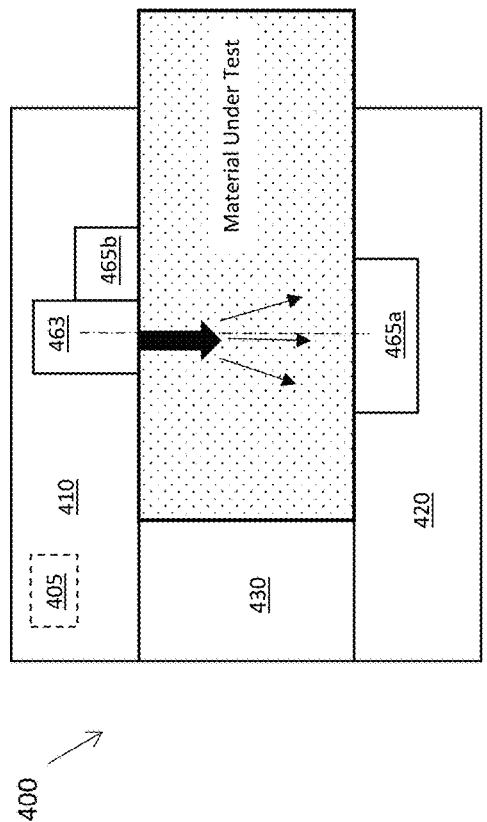
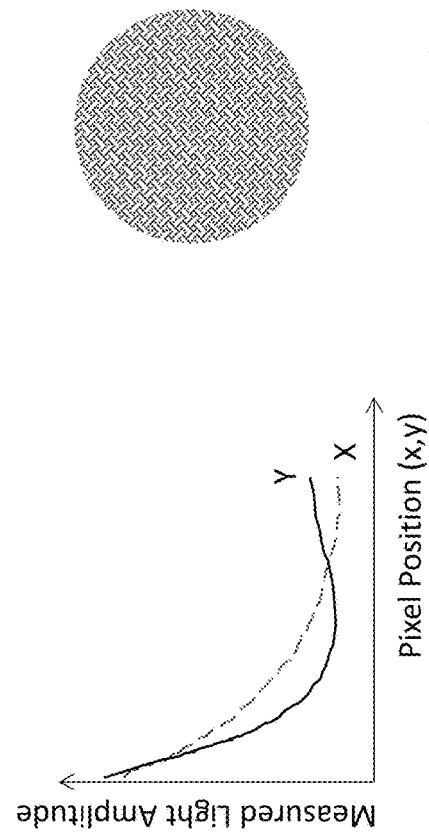
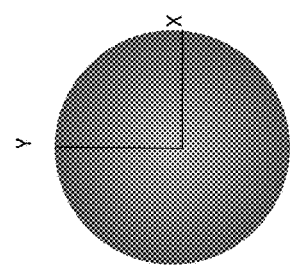
FIG. 4
FIG. 4A
FIG. 4B
FIG. 4C

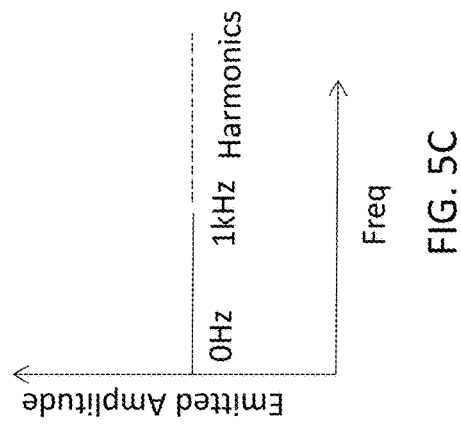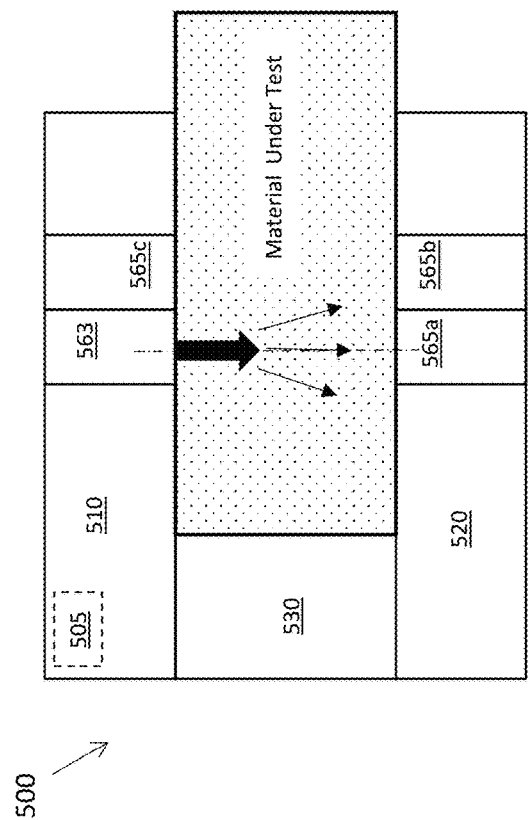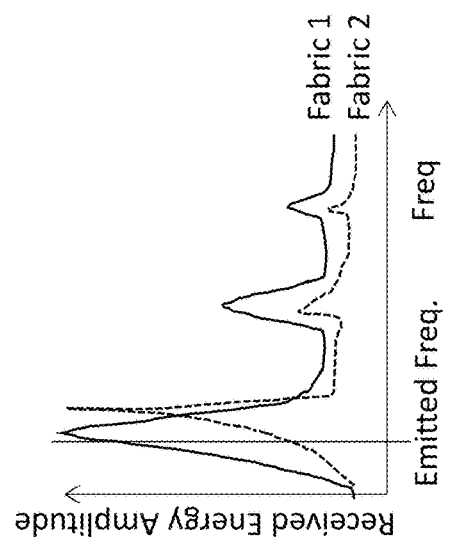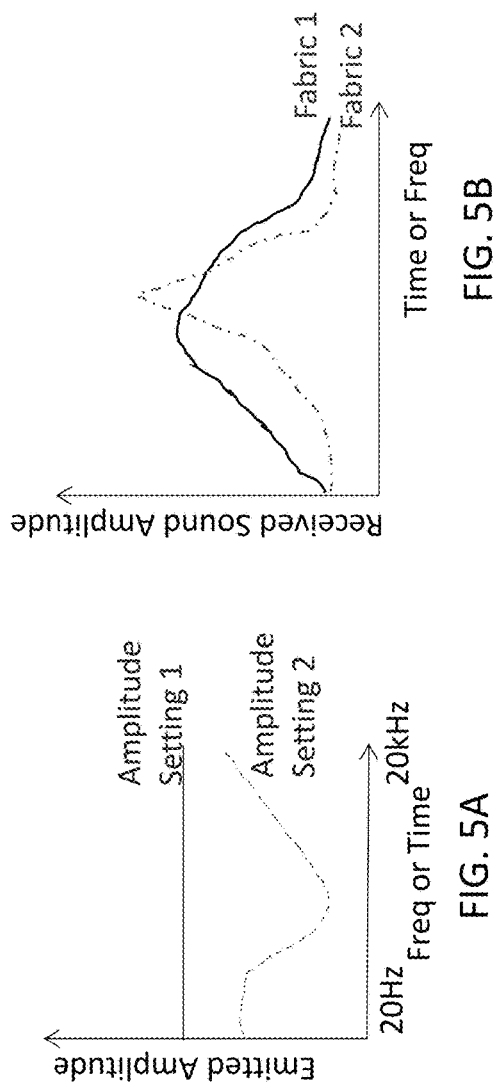
FIG. 5
FIG. 5A
FIG. 5B
FIG. 5C
FIG. 5D

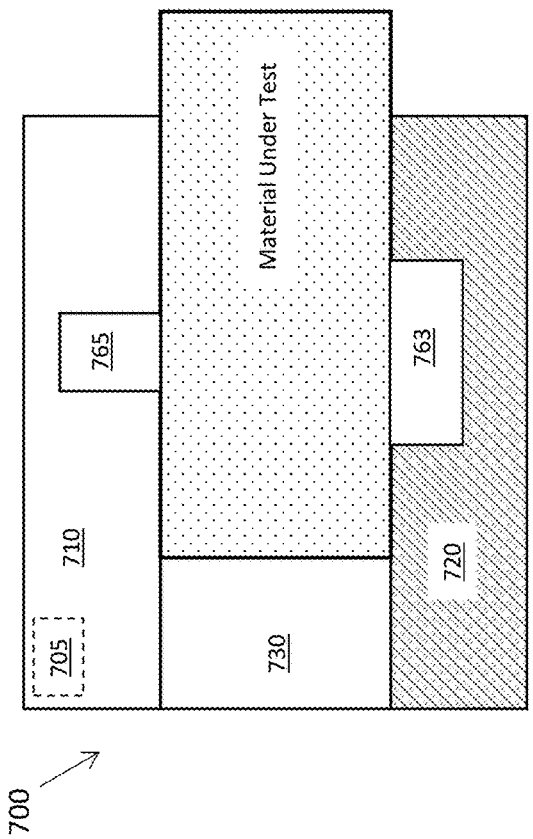
FIG. 7
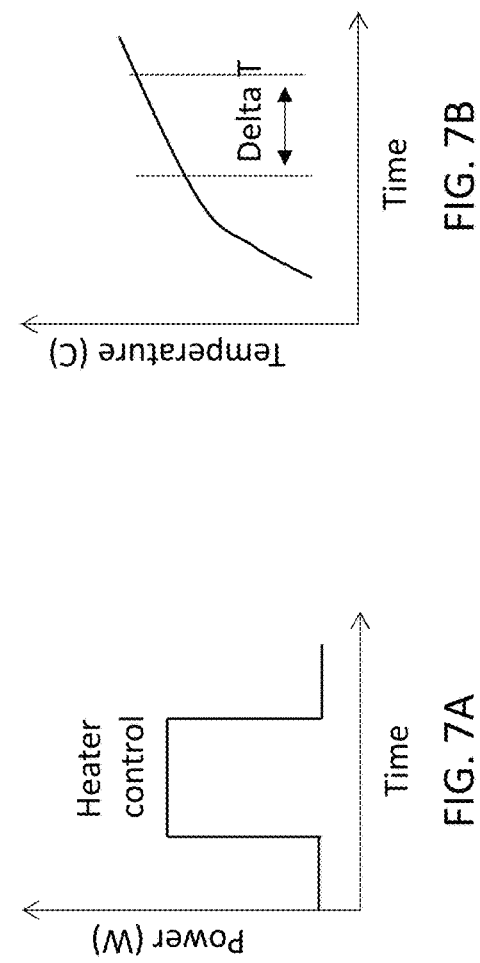
FIG. 7C
FIG. 7B
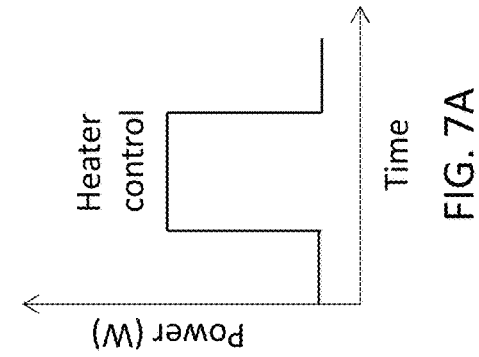
FIG. 7A

MATERIAL PROPERTY TESTING SYSTEM AND METHOD

This application is a National Phase entry application of International Patent Application No. PCT/US2019/059074 filed on Oct. 31, 2019, which claims priority to U.S. Provisional Patent Application No. 62/754,671 filed on Nov. 2, 2018, entitled "SYSTEM AND METHOD FOR EVALUATING THERMAL INSULATION FOR FABRIC," and U.S. Provisional Patent Application No. 62/861,341 filed on Jun. 14, 2019, entitled "MATERIAL PROPERTY TESTING SYSTEM AND METHOD," the entire disclosures of which of which are incorporated herein by reference for all purposes.

STATEMENT REGARDING FEDERALLY SPONSORED RESEARCH OR DEVELOPMENT

This invention was made with Government support under Award Number 1913401 and Award Number 2051808 awarded by the National Science Foundation. The Government has certain rights to this invention.

BACKGROUND

Many materials are selected for specific applications based on their thermal properties, such as thermal resistance an thermal conductance. The thermal resistance of a material characterizes or quantifies the level of thermal insulation provided by the material. The thermal resistance of a material may be expressed in several ways, including "R-value," thermal insulance, or intrinsic thermal insulation (measured in $m^2K/W$); absolute thermal resistance (measured in K/W), or specific thermal resistance (measured in mK/W). The thermal resistance of a material is an important characteristic when the material will be used in buildings or other structures, apparel, household goods, electronic devices, and so on.

BRIEF DESCRIPTION OF THE DRAWINGS

FIGS. 1A-1E illustrate an exemplary material property measurement device in accordance with various aspects described.

FIGS. 3, 3A-3B illustrate an exemplary material property measurement device in accordance with various aspects described.

FIGS. 4, 4A-4C illustrate an exemplary material property measurement device in accordance with various aspects described.

FIGS. 5, 5A-5D illustrate an exemplary material property measurement device in accordance with various aspects described.

FIGS. 7, 7A-7D illustrate an exemplary material property measurement device in accordance with various aspects described.

DESCRIPTION

Figure 1C:
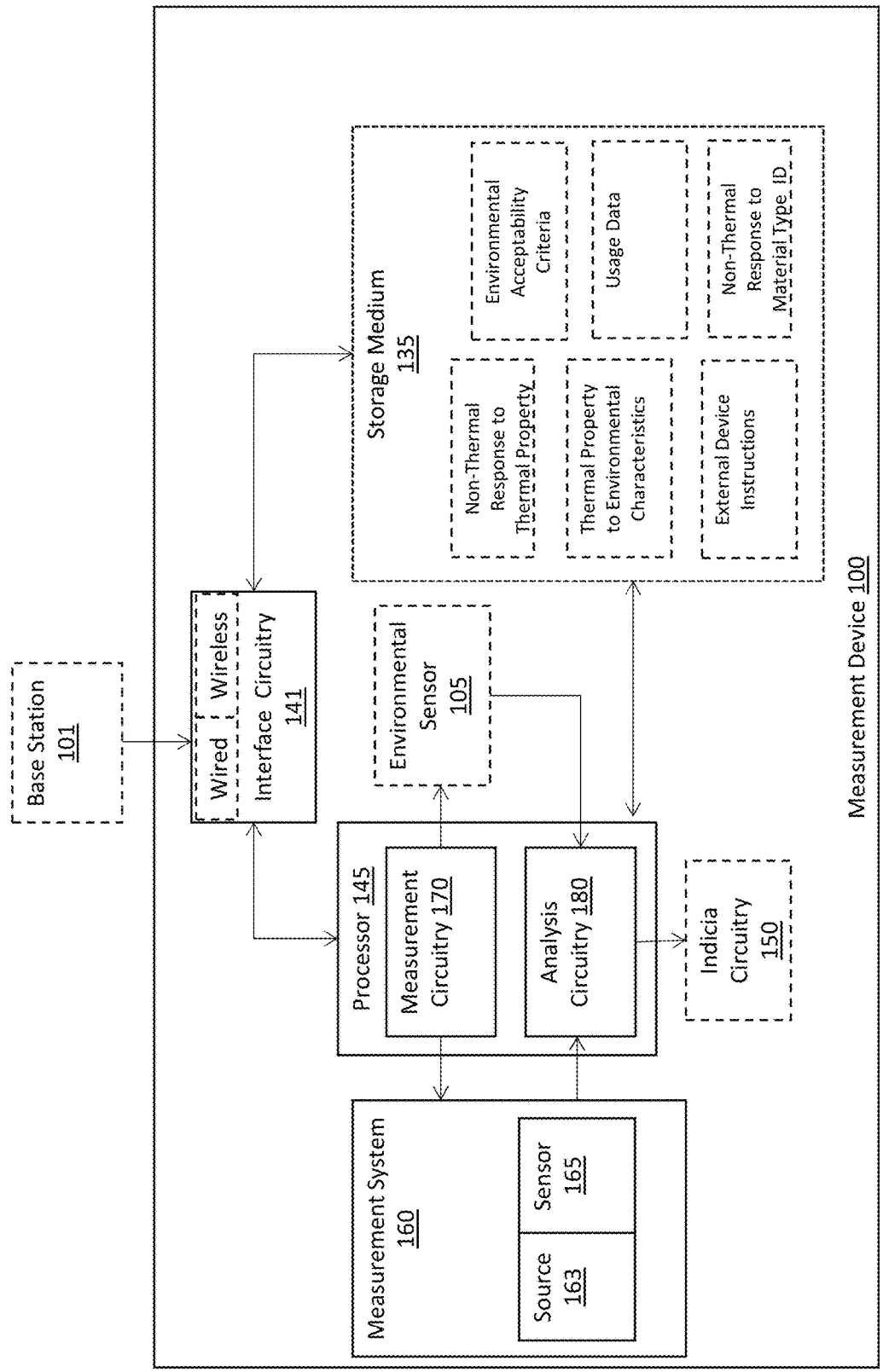

The determination of a material's thermal resistance is typically made in a laboratory environment using expensive and cumbersome test equipment and lengthy test procedures. However, in some circumstances a consumer or other non-technical person may want to determine or approximate a material's thermal resistance. For example, a person choosing a building material for a home project may be interested in determining the comparative thermal resistance of two different types of wall coverings. A person choosing camping gear may want to know the thermal resistance of a sleeping bag or coat they are considering purchasing. A parent choosing a garment for their baby may want to know the thermal resistance of different garments to maximize the baby's comfort. A person exercising or competing in a sport may want to know whether a garment is suitable for the environmental conditions. There are other properties of materials that may be of interest to users making a material selection such as the present moisture content of the material and/or the compressibility or softness of the material. In the following description, the term "baby" will be used as a shorthand notation to refer to the person who is wearing a garment made of the material under test.

Disclosed herein are measurement systems and methods that facilitate the measurement of various material properties using a measurement device that is suitable for use by a consumer. The measurement device may be handheld or portable and affordable for purchase for household use.

In some instances simply knowing a garment's various properties, such as thermal resistance, is not sufficient to enable a consumer to select a suitable material for a given purpose or application. Thus, assessing the suitability of the material's properties for a given environment or application is another potentially useful feature provided by some examples of the measurement device described herein. It may also be helpful for the measurement device to evaluate and report selected characteristics of the present environment (e.g., temperature, humidity, air quality) that may aid a consumer in selecting a material for use in the environment.

Portions of the following description will be in the context of a measurement device that determines one or more properties, such as thermal resistance, of a garment's fabric. One possible application of the described measurement device and method is to determine the suitability of a given garment for a given environment (e.g., temperature and/or humidity). The measurement device can be used by individuals seeking a garment that will be suitable (e.g., comfortable) for their environment (or predicted environment). The measurement device can be used by caregivers to select garments for babies or adults under their care that may not be able to provide feedback on their comfort. While many specific examples are presented, it is to be understood that the described methods, devices, and circuitries are also applicable to the thermal property measurement of any material.

The disclosed measurement device utilize non-thermal energy sources and sensing technologies to determine a thermal property of a material or garment, thereby facilitating fast, simple evaluation of the thermal property by a consumer. For the purposes of this description, the term "thermal property" is to be broadly construed as including any property that affects a level of comfort in terms of the wearer's body temperature. Examples of thermal properties include breathability, thickness, thermal resistance, thermal conductivity, compressibility, and so on.

The present disclosure will now be described with reference to the attached figures, wherein like reference numerals are used to refer to like elements throughout, and wherein the illustrated structures and devices are not necessarily drawn to scale. As utilized herein, terms "module", "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include one or more processors therein to execute executable instructions stored in computer readable storage medium and/or firmware that confer(s), at least in part, the functionality of the electronic components.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

As used herein, a signal that is "indicative of" a value or "corresponding to" other information may be a digital or analog signal that encodes or otherwise communicates the value or other information in a manner that can be decoded by and/or cause a responsive action in a component receiving the signal. The signal may be stored or buffered in computer readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, "determine" or "determining" some quantity or characteristic is to be construed in non-limiting manner to include directly or indirectly measuring, estimating, calculating, reading data from storage medium, approximating, receiving data from another component, identifying, receiving a signal from a measurement device, computing, and so on. The function of determining may be performed by circuitry or hardware components and/or computer-executable instructions in execution by a processor or device.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

Use of the word example is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure.

In addition, features of the different embodiments described hereinafter may be combined with each other, unless specifically noted otherwise.

FIGS. 1A-1E illustrates various aspects of an exemplary thermal property measurement device 100 configured to be portable, handheld, and suitable for consumer use. In FIG. 1A, general components of the device 100 can be seen, including a portable housing that includes a first member 110, a second member 120, a clamping mechanism 130 connecting the first member to the second member, and a handle mechanism 140 that is operable to move the first member and the second member between an open position and a closed position.

In the open position (not shown), the first member and the second member are positioned relatively widely apart from one another. The clamping mechanism includes a pivot point about which handle members can be moved to open and close the first and second members. As illustrated best in FIG. 1D in the closed position an inside surface of the first member 110 contacts a first side of a material sample and an inside surface of the second member 120 contacts a second side of the material sample opposite the first side. In one example, the clamping mechanism 130 is configured to maintain an orientation of the first member normal or perpendicular to the second member as the device is moved between the open position and the closed position. In this example the clamping mechanism may include a linkage arrangement rather than or in addition to a pivot arrangement.

In one example, the clamping mechanism 130 includes a feature that limits a pressure applied to the material sample when the first member and the second member are in the closed position. For example, the clamping mechanism may include a spring that relieves the clamping pressure beyond some limit. As will describe in more detail in FIG. 6C, the clamping mechanism may be a servo motor configured to move the members together until contact with the material is sensed. A separate relief feature may be included that prevents the device 100 from overly compressing a sample material being measured which may degrade the measurement quality.

Indicia circuitry 150 disposed in the housing 140 is configured to communicate information related to a determined material property. The indicia circuitry 150 may be configured to display indicia indicative of the information and/or generate an audible signal indicative of the information. In one example indicia circuitry 150 causes a mobile communication device (e.g., cellphone) to display the information. In this example, the indicia circuitry 150 includes storage medium storing computer-executable instructions that, when executed by a mobile communication device 155, cause the mobile communication device to receive the information and display the information on the mobile communication device as illustrated in FIG. 1B. These instructions are transmitted to a mobile device during set up.

Figure 10:
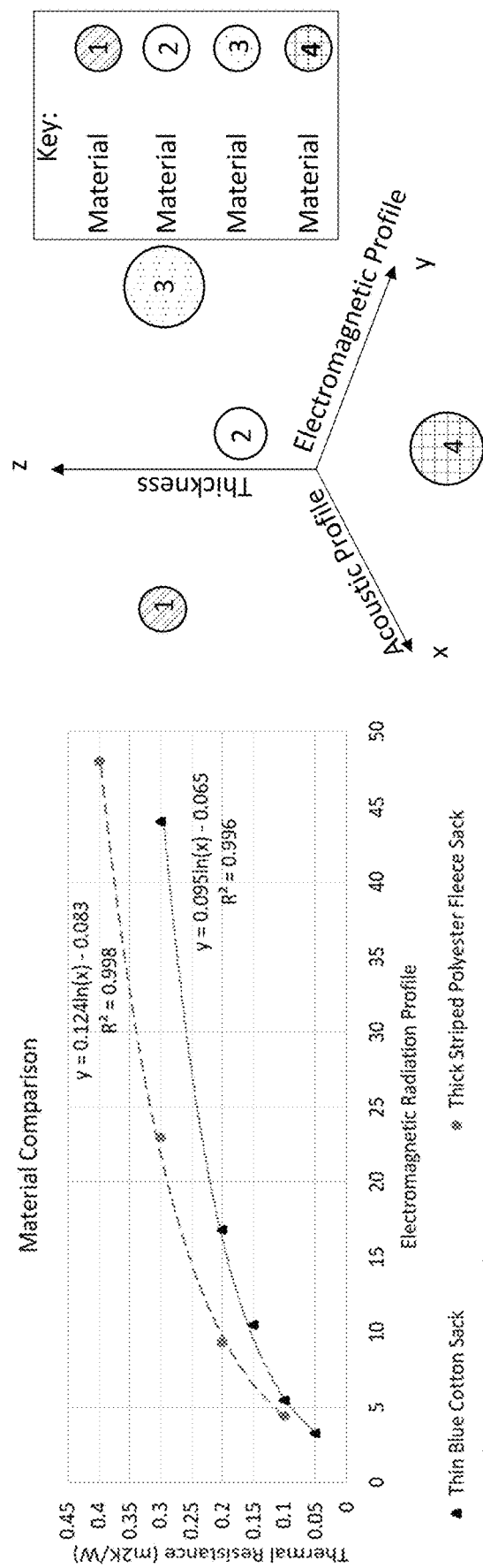
FIG. 10 illustrates how material property measurement techniques may be used to identify a material type identifier in accordance with various aspects described.

FIG. 10 illustrates a functional block diagram of electronic aspects of the thermal property measurement device 100. Many of these electronic aspects are not explicitly labeled in other figures for the sake of simplicity. The device 100 includes a measurement system 160 that includes a source element 163 in the first member 110 and at least one sensor element 165. The device 100 also includes measurement circuitry 170 configured to control the source element 163 to apply energy to the sample material and the sensor element 165 to generate data indicative of the sample material's response to the energy. The measurement circuitry 170 and/or analysis circuitry 180 may be embodied as a processor executing instructions for performing the described functions of the measurement circuitry 170 and/or analysis circuitry 180.

An environmental sensor 105 is configured to measure an environmental characteristic, such as temperature and/or humidity, of the environment surrounding the device 100. The analysis circuitry 180 is configured to determine a thermal property of the sample material based on the data from the measurement circuitry and provide information related to the thermal property to the indicia circuitry 150. In one example, the analysis circuitry 180 receives environmental characteristic data from the environmental sensor element 105 and determines, based on the thermal property, if the material is suitable for the environment. In one example, the analysis circuitry 180 is configured to combine determined thermal properties for multiple layers (e.g., adding the thermal resistance of a garment and a sleep sack) and provide information related to the combined thermal properties to the indicia circuitry. In one example, the environmental characteristic data is received from an external source by way of interface circuitry 141. For example, weather forecast data from a mobile device may be wirelessly transmitted (e.g., Bluetooth) to the analysis circuitry. The determined suitability may be displayed on the indicia circuitry 150. Recall that the indicia circuitry 150 may be integrated with the device as shown in FIG. 1A or at least partially integrated with a mobile communication device 155 as shown in FIG. 1B.

In one example, a base station or docking station 101 is provided into which the measurement device 100 may be docked (e.g., by way of wired interface 141) to allow for wired communication between the measurement device 100 and another device and/or to charge the measurement device. In this example, the base station communicates with the measurement device in a same manner as a cellphone may communicate wirelessly with the measurement device. Alternatively, a cellphone or other device may be plugged into the base station to enable communication between the cellphone or other device and the measurement device 100 when a wireless connection is not available.

In one example, the analysis circuitry 180 is configured to leverage the processing power of an external device (e.g., a cellphone's image processing capabilities). In this example, the analysis circuitry includes storage medium storing computer-executable instructions that, when executed by the mobile communication device 155 of FIG. 1B, cause the external device to receive data, process the data, and transmit the data back to the analysis circuitry 180 for use in determining the thermal property. These instructions may be transmitted to the external device during setup.

The measurement device 100 may include storage medium 135 that is configured to store data used by the device in determining the information that is displayed by indicia circuitry 150. If the storage medium 135 is not internal to the measurement device 100, the storage medium is accessible to the device by way of a communication link to an external storage medium. Examples of types of data that may be stored in storage medium 135 (e.g., in the form of lookup tables, databases, and so on) include data mapping non-thermal response (indicative of a material's response to a non-thermal stimulus) to thermal property values and data mapping thermal property values to ranges of environmental characteristics (e.g., thermal resistance values mapped to ranges of temperatures in which material having the thermal resistance will be comfortable). Data encoding external device instructions (that may be transmitted to a user's device during setup to enable communication and/or coprocessing of data) may be stored. Environmental acceptability criteria (e.g., acceptable temperature/humidity ranges representing a default set of ranges or a custom set of ranges as determined for a particular user) may be stored.

User specific biometric data may also be stored (e.g. age, gestational age, weight, sex) for use in determining suitable calibration schemes and/or processing algorithms to use when determining recommendations, or to adjust calibration constants ensuring the device operation is tailored to the given application/user. For example, for premature or underweight babies (as determined by the user specific data) the thermal resistance recommended by the device for a given ambient temperature may be slightly increased. Usage data which is collected during use of the device may be stored for use in providing historical feedback and/or adapting the operation of the device to fit a particular user's characteristics.

Data mapping non-thermal response to material type may also be stored for use in identifying a material type in addition to the material's thermal property. Material type parameters that may be identified include material composition (e.g., cotton vs polyester), thread counts, fabric density, spun/weave/stitch construction, and so on. In one example, some of the data in the storage medium 135 is stored on storage medium in the measurement device 100 and some of the data in the storage medium 135 is stored on a remote device.

Figures 1D, 1E:
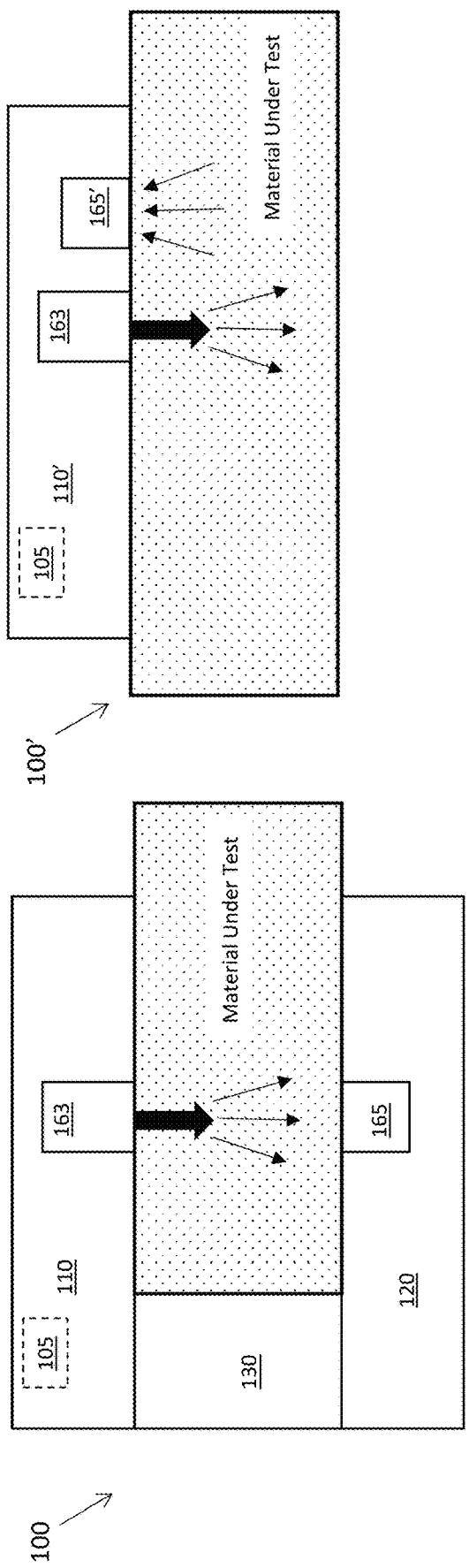

FIG. 1D illustrates a functional block diagram of the device 100 that will be used throughout this description to describe various configurations of sources and sensors for measuring different non-thermal (and thermal) properties of a material. The first member 110 is connected to the second member 120 with clamping mechanism 130. The environmental sensor 105 is illustrated as being disposed in the first member 100, however the sensor 105 may be in another location (even external to the device 100). A source element 163 is disposed in the first member 110. In some examples, multiple source elements, providing different types of stimulus (e.g., electromagnetic radiation, sound, vibration, compression, heat) will be present in an "array" of source elements. A sensor element 165 is disposed in the second member 120. In some examples, multiple sensor elements, capable of detecting different types of stimulus will be present in an "array" of sensor elements.

FIG. 1E illustrates a functional block diagram of an alternative device 100' that is a probe or wand that does not clamp around the material sample, which will also be referred to as the material under test. In this example, the sensor element 165' is disposed in a same member 110' as the source element 163. The examples illustrated herein in which the device is embodied as a clamp may be extended to include the modification illustrated in FIG. 1E wherever possible.

Electromagnetic Energy-Based Non-Thermal Material Properties

Figure 2:
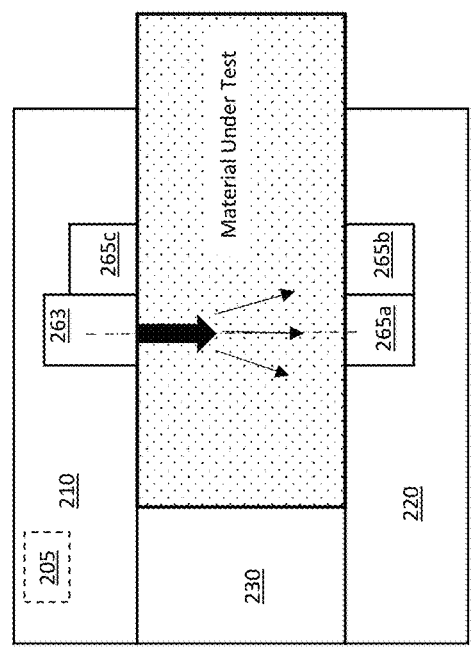
FIGS. 2 and 2A illustrate an exemplary material property measurement device in accordance with various aspects described.

FIG. 2 illustrates an exemplary measurement device 200 that includes first member 210, second member 220, and clamping mechanism 230. A material under test has been positioned between the first member 210 and the second member 220 and the members are held in the closed position by the clamping mechanism 230 exerting sufficient pressure to contact the material under test without significantly compressing the material. An environmental sensor 205 is configured to measure an environmental characteristic, such as temperature and/or humidity, of the environment surrounding the device 200. The measurement device 200 utilizes electromagnetic radiation (e.g., visible or non-visible light) to determine a thermal property of the material under test. An electromagnetic radiation source element 263 is an LED operating in non-visible light spectrum (750 nm to 1100 nm), most likely 850-950 nm. The electromagnetic radiation source element 263 may be operated at constant power, for brief periods of time, when controlled to do so by measurement circuitry (not shown).

A first electromagnetic radiation sensor element 265a is a photodiode placed in axis of the emitted electromagnetic radiation. It is matched (receptive) to the wavelength of electromagnetic radiation emitted by the electromagnetic radiation source element. Other wavelengths of electromagnetic radiation may be excluded. The output of the photodiode may be converted into a voltage drop over it, or it could be a photodiode system with CMOS that outputs a series of pulses having a frequency proportional to the electromagnetic radiation intensity it receives. A second electromagnetic radiation sensor element 265b is another photodiode, operating at the same wavelength as electromagnetic radiation sensor element 265a. This diode is located off-axis, and so is not a direct measure of transmission/absorption, but rather measures scatter. A third electromagnetic radiation sensor element 265c is another photodiode located along side, or behind the electromagnetic radiation source element 263, and so that the third electromagnetic radiation sensor element 265c measures the backscatter from the electromagnetic radiation source and/or material.

The electromagnetic radiation emitted by the electromagnetic radiation source element 263 is not in the visible wavelength range so it is less influenced by the color of the fabric through which it has to pass. It is operated at constant current and voltage to ensure it emits a consistent amount of electromagnetic radiation (consumes the same power) every time, and operates in the condition under which it was calibrated. In one example a electromagnetic radiation source of broad wavelength could be used that spans visible to non-visible IR electromagnetic radiation (e.g., between about 300-1100 nm). The electromagnetic radiation sensor elements should be configured to be receptive to those emitted wavelengths.

Figure 2A:
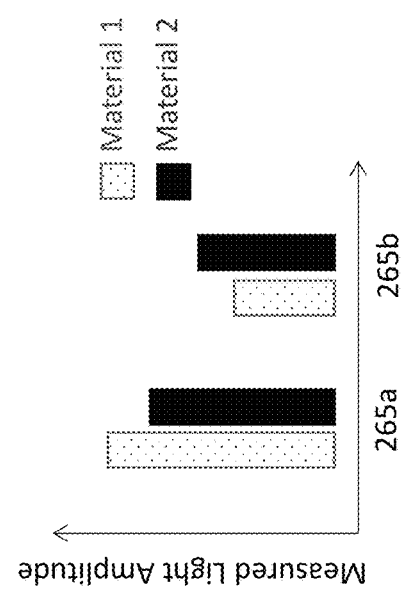

The electromagnetic radiation sensor elements 265a-c are selected to be receptive to the wavelength of electromagnetic radiation coming from the electromagnetic radiation source element 263 in order to reduce the effect of other influences. The various outputs of the sensor elements will be recorded synchronously for a period of time of around 5 seconds (to allow for stabilization of readings) as illustrated in FIG. 2A. An algorithm combines the response of the three electromagnetic radiation sensor elements to identify to the fabric type and/or thermal resistance the fabric (as measured by an ASTM recognized machine configuration). A correlation will then be made between sensed values and the predicted/approximated thermal resistance of the fabric. Another thermal property that may be determined by analyzing the electromagnetic radiation received by electromagnetic radiation sensor elements is breathability (similar to porosity) of the material under test. Breathability may be one factor used to determine the material's type.

FIG. 3 illustrates an exemplary measurement device 300 that includes first member 310, second member 320, and clamping mechanism 330. A material under test has been positioned between the first member 310 and the second member 320 and the members are held in the closed position by the clamping mechanism 330 exerting sufficient pressure to contact the material under test without significantly compressing the material. An environmental sensor 305 is configured to measure an environmental characteristic, such as temperature and/or humidity, of the environment surrounding the device 300. The measurement device 300 utilizes electromagnetic radiation to determine a thermal property of the material under test. A electromagnetic radiation source element 363 is an LED operating in non-visible light spectrum (750 nm to 1100 nm), most likely with a peak wavelength in the range of 850-950 nm. The electromagnetic radiation source element 363 will be operated at varying powers, such as a power sweep, as shown in FIG. 3A, for brief periods of time, as controlled by the measurement circuitry (not shown).

First electromagnetic radiation sensor element 365a is a photodiode placed in axis of the emitted electromagnetic radiation. It is receptive to the wavelength of electromagnetic radiation emitted by the electromagnetic radiation source element 363. Ideally other wavelengths of electromagnetic radiation will be excluded preferentially. Output of the photodiode may be converted into a voltage drop, or the photodiode could include a CMOS that outputs a sequence of pulses having a frequency that is proportional to the electromagnetic radiation intensity the photodiode receives. Second electromagnetic radiation sensor element 365b is another photodiode operating at the same wavelength as the electromagnetic radiation source element 363. This photodiode is located off-axis, and so is not a direct measure of transmission/absorption, it measures scatter. Third electromagnetic radiation sensor element 365c is another photodiode located along side, or behind the electromagnetic radiation source 363, and so measures the backscatter from the material sample.

The electromagnetic radiation emitted by the electromagnetic radiation source element 363 is not in the visible wavelength range so it is less influenced by the color of the fabric through which it has to pass. The electromagnetic radiation source element begins operation at the lowest possible current to open the diode and increases up to the maximum operating current of the diode over a couple of seconds (light power sweep). The sensor response from the first and second electromagnetic radiation sensor elements 365a, 365b are monitored throughout to produce two curves that are characteristic of the fabric under different electromagnetic radiation powers as shown in FIG. 3B. In one example a electromagnetic radiation source of broad wavelength could be used that spans visible to non-visible IR light (e.g., 300-1100 nm). The electromagnetic radiation sensor elements should be configured to be receptive to those emitted wavelengths.

The sensor elements are selected to be receptive to the wavelength of electromagnetic radiation coming from the emitter in order to minimize the effects of other influences. The various outputs of the sensor elements are recorded synchronously for a period of time of about 5 seconds (to allow for stabilization of readings). An algorithm combines the response of the three electromagnetic radiation sensor elements to identify to the fabric type and/or thermal resistance the fabric (as measured by an ASTM recognized machine configuration). In combination with other techniques taught herein various physical parameters of the material under test can be determined, and related to predicted thermal properties. In a simple example, a correlation is made between the sensed values from the electromagnetic radiation-based system and the thermal resistance of the material.

FIG. 4 illustrates an exemplary measurement device 400 that includes first member 410, second member 420, and clamping mechanism 430. A material under test has been positioned between the first member 410 and the second member 420 and the members are held in the closed position by the clamping mechanism 430 exerting sufficient pressure to contact the material under test without significantly compressing the material. An environmental sensor 405 is configured to measure an environmental characteristic, such as temperature and/or humidity, of the environment surrounding the device 400. The measurement device 400 utilizes electromagnetic radiation to determine a thermal property of the material under test.

Light source element 463 is an LED operating in non-visible light spectrum (750 nm to 1100 nm), most likely 850-950 nm. The electromagnetic radiation source element 463 is operated at constant power, for brief periods of time, as controlled by measurement circuitry (not shown). Instead of using photodiodes as sensor elements as illustrated in FIGS. 2 and 3, sensor element 465a is a digital camera matched to the wavelength of the electromagnetic radiation source element 463. A second sensor element 465b, which may be a photodiode or photodiode array, is included to measures the backscatter from the material sample.

Images of the back side of the material sample are recorded by the camera 465a and then passed to analysis circuitry (not shown) that includes vision/image interrogation software (such as National instruments Vision Development Module). As already discussed, the analysis circuitry that executes the vision/image interrogation software may be integrated into the measurement device or resident on a mobile communication device that receives image data (e.g., via a wireless or wired connection) from the measurement device.

The electromagnetic radiation emitted by the electromagnetic radiation source element 463 is not in the visible wavelength range so it is less influenced by the color of the material through which it has to pass. The electromagnetic radiation source element 463 is operated at constant current and voltage to ensure it emits a consistent amount of electromagnetic radiation (consumes the same power) every time, and operates in the condition under which it was calibrated. As outlined in FIGS. 4A and 4B, the image from the camera 465a may be analyzed for a number of things, such as the intensity at the center of the image (in axis of the electromagnetic radiation source element), the exact gradient of transmission/adsorption/scatted profile. The pattern of the material structure (see FIG. 4C) will also be visible for matching to stored material patterns (e.g. whether the material is woven or spun, like weaved cotton or fleece, and so on). The absolute intensity of the image can also be measured. The combination of features analyzed by the vision/image software will help to identify the material type, and its thermal resistance (again as measured by an ASTM recognized machine configuration).

Mechanical Vibration-Based Non-Thermal Material Properties

FIG. 5 illustrates an exemplary measurement device 500 that includes first member 510, second member 520, and clamping mechanism 530. A material under test has been positioned between the first member 510 and the second member 520 and the members are held in the closed position by the clamping mechanism 530 exerting sufficient pressure to contact the material under test without significantly compressing the material. An environmental sensor 505 is configured to measure an environmental characteristic, such as temperature and/or humidity, of the environment surrounding the device 500. The measurement device 500 utilizes mechanical vibration in the form of acoustic energy or sound to determine properties of the material under test that relate to a thermal property of the material under test.

In one example, the sound source element 563 is a speaker capable of emitting sound from 20 Hz to 20 kHz (audible range). In some examples, the speaker operates above that sound frequency. In this example, the sound sensing element 565a is a microphone with suitable response (matched to the speaker emission) placed in axis on the second member 520 on the other side of the material sample under test. A second sound sensor element 565b is an off-axis microphone that is used in collaboration with sound sensor element 565a. An optional third sound sensor element 565c detects backscatter sound, and may also be used to verify and validate various properties of the emitted sound and may also be used to allow for determination of phase shift when compared to other data received by the sensor elements 565a and 565b.

As illustrated in FIG. 5A the speaker 563 will emit a sweep of frequencies from 20-20000 Hz over a period of about 3 seconds and may use a constant or varying amplitude profile. In other examples, the speaker 563 emits a "buzz" comprising single tone or chord, at a frequency (e.g., 20 KHz) which may be selected based on a type of material. At the point of emission the microphone system 565a-565c is initialized and records sound as it is received after having passed through the material under test. Emission and received sound are recorded synchronously, such that at any given point in time, it is known at what frequency the emitter was resonating, and what the receiver should have registered. From here is it possible to create an approximate frequency/amplitude plot as shown in FIG. 5B (similar to the output of a Fast Fourier Transform (FFT) analysis), without having to perform an entire FFT. An FFT analysis of the entire recording may also be done to verify findings, but may not be required ultimately, saving expensive processing power and vital time to execute analysis. In one example, data indicative of the emitted and recorded sound may be "exported" to a mobile communication device having sufficient processing resources to perform an FFT analysis of the sound data.

Data collected from the material under test may be operated on such that the frequency or time domain amplitude result is subtracted from a pre-determined calibration constant. In one example, the thickness of the material sample is used to select the appropriate calibration data from a look-up table or similar regression, containing values of amplitude responses from varying open gap conditions (i.e., without a material under test between the first and second members such that there is open air in the gap). FFT spectra recorded from the material under test may be analyzed for peak and valley amplitudes and for the frequency-based locations of those features and in this manner compared to stored results of similar analysis of FFT spectra recorded for different types of materials to aid in determining a type of the material under test. The FFT spectra recorded from the material under test may be subject to integral analyses, whereby the total value of the energy received by 565a and 565b and/or 565c is determined. The FFT spectra recorded from the material under test might be compared to previously recorded FFT spectra and shape and analyzed by checking for a match using comparison techniques.

The sound response of material may be useful in probing the relative porosity of the material (i.e., check that the material is not a continuous plastic sheet, or a foil). The analysis circuitry should correlate the sound response to the breathability of the material, as the material structure will influence the sound transmission, particularly where locally solid barriers are imposed (e.g., solids like foil, plastic, and so on, that aren't breathable).

In one example, the measurement device uses mechanical energy (e.g., vibrations) to determine a non-thermal property of the material under test. In this example, the source element 563 is a vibrator (e.g., an unbalanced motor vibrator, or electromechanical shaker) capable of imparting physical motion to the material under test. The source element 563 is capable of creating first harmonic vibrations in the 0 Hz-1 kHz region. To ensure physical motion is adequately transmitted to the material under test, at least a portion of the material contacting surfaces of 510 and 520 may include suitable surface roughness, such that the material under test is gripped and unable to move once the clamp is in the closed position. Therefore the clamp surfaces should not be entirely 'smooth'. The required surface roughness imparts a locally high contact pressure to small elements of the fabric at the tips of asperities, while maintaining the bulk compressing pressure in the range of 0.5 kPa to 1.5 kPa as controlled by the apparent area of contact and the clamping mechanism 530. The source element 563 may also induce other harmonic vibrations at higher frequencies. In this example, the sensing element 565a' is a 3-axis accelerometer with suitable response (e.g., matched to the energy emission) placed in axis on the second member 520. An optional third accelerometer element 565c can be operable to synchronously monitor the energy emission of the source element 563.

As illustrated in FIG. 5C the vibrator 563 may emit a sweep of frequencies from 0-1 KHz over a period of about 3 seconds. In another example, the vibrator 563 may operate at a single frequency, or discretely step through various frequencies. At the point of emission, the accelerometer system 565a-565c is initialized synchronously and records displacement energy both as it is generated (565c) and as it is received after having passed through the material under test (565a, 565b). The properties of the material under test may directly influence the emission characteristics of the vibrator 563 and so recording the emitted energy using 565c may be beneficial. Emission and received sound are recorded synchronously, such that at any given point in time, it is known at what frequency the emitter was resonating, and what the receiver should have registered.

FIG. 5D shows the result of conducting Fast Fourier Transform analysis on the recorded accelerometer data. Comparative differences in data received are related to physical properties of the material under test. For example, phase and frequency shifts relative to the emitted energy can be detected and attribute to properties of the material relating to thermal resistance. Analysis of higher harmonics measured at 565a may also help to determine physical properties of the material under test that relate to its thermal resistance. In another example, analysis of the data generated by accelerometers 565a and 565c may simply be evaluated for amplitude, and so results are indicative of the bulk attenuation of energy as a result of interactions with the material under test. In another example, accelerometers 565a and 565c may be replaced by microphones to achieve a similar functionality.

Physical vibration of the material under test yields knowledge of the microstructure composition under larger scale deformation than is possible using acoustical energy alone. In particular, physical vibration is good for probing vibratory deformation response at lower frequencies and higher amplitudes than acoustical energy alone. The vibratory response of material may be useful in probing structural properties of the material. In one example, the detected responses may relate to stiffness, elasticity and material density which are function of material composition (e.g., polymer, elastomer, cotton, and so on) and the construction type (e.g., weave, spun, infill, and so on) and all have a role in the bulk thermally resistive properties of the material under test.

Coupling the material's vibratory response to electromagnetic radiation, heat, or sound energy with thickness and compressibility data may create a scheme whereby the material's type (e.g., fleece or cotton) can be identified and its thermal resistance can be approximated/determined. Note that the pre-measured response of the system with the measurement device in the closed position may be subtracted from the measured test data to remove background characteristics. The amplitude response measured is both a function of interactions with the material structure and the path length of the sound energy transmission.

Compressibility-Based Non-Thermal Material Properties

Figure 6C:
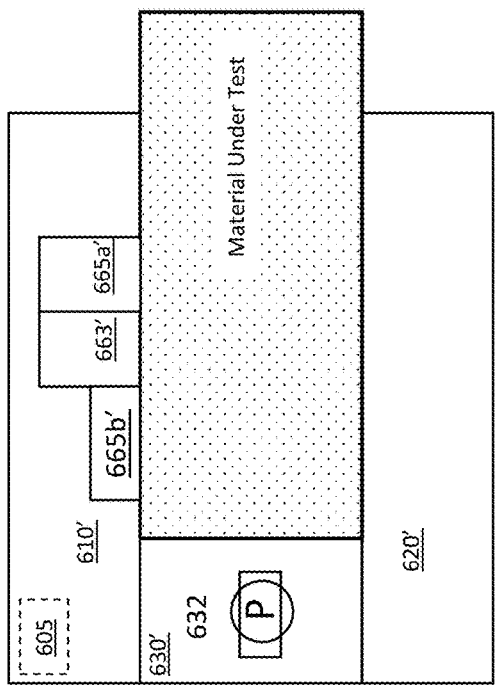
FIGS. 6A-6D illustrate an exemplary material property measurement device in accordance with various aspects described.
Figure 6D:
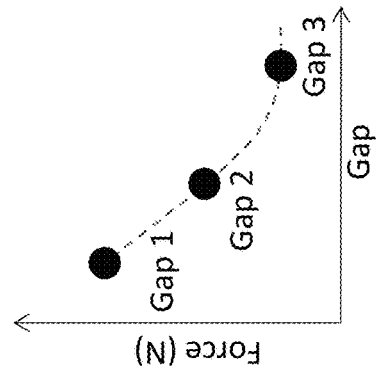
Figure 6A:
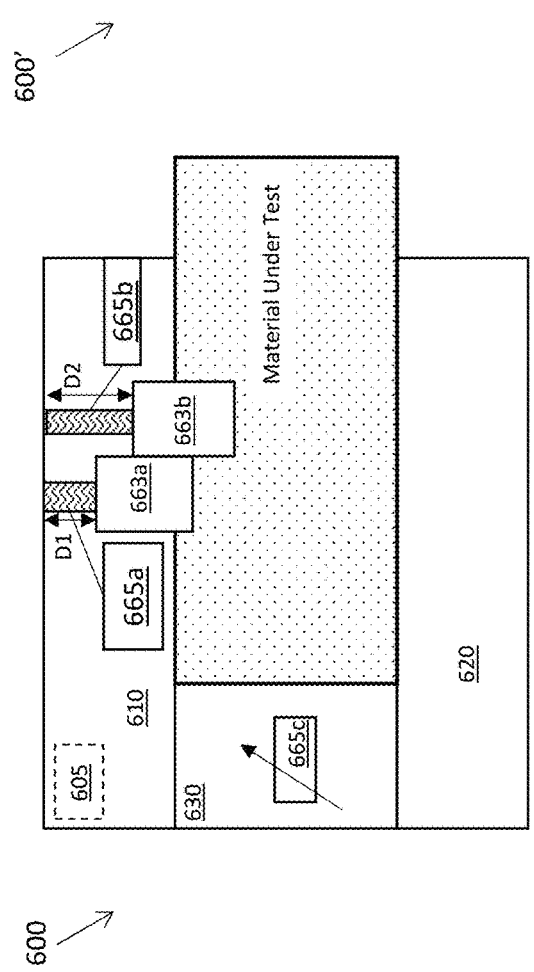

FIG. 6A illustrates an exemplary measurement device 600 that includes first member 610, second member 620, and clamping mechanism 630. A material under test has been positioned between the first member 610 and the second member 620 and the members are held in the closed position by the clamping mechanism 630 exerting sufficient pressure to contact the material under test without significantly compressing the material (e.g., applying a pressure between 0.5 kPa and 1.5 kPa). The clamping mechanism is configured to limit the pressure placed on the material under test to some predetermined amount (e.g., less than approximately 1.5 kPA). The pressure may be controlled by a separate relief feature such as a spring arranged about a pivot point. An environmental sensor 605 is configured to measure an environmental characteristic, such as temperature and/or humidity, of the environment surrounding the device 600. The measurement device 600 utilizes mechanical energy stored in springs to determine the thickness and a thermal property of the material under test.

Mechanical source elements are spring-loaded wide-area contact elements 663a, 663b. Spring-loaded wide-area contact element 663a has a lower spring constant/surface area combination than spring-loaded wide-area contact element 663b. Thus the wide-area contact element 663a exerts less pressure on the material under test than the wide-area contact element 663b. Spring-loaded wide-area contact elements 663a, 663b may have lower spring constants than the clamping mechanism 630, but the reduced area of the wide-area contact elements as compared to the area of the members 610, 620, allows the spring-loaded wide-area contact elements to apply a higher pressure than the clamping pressure in a limited portion of the material under test.

Distance sensor elements 665a, 665b (e.g., linear variable resistors in some examples) measure the extension of both springs 663a, 663b. Distance D1 is the extension of the spring with low spring constant (or larger contact element area) which exerts lower pressure. Distance D2 is the extension of the spring with high spring constant (or smaller contact element area) which exerts higher pressure. A third angle or gap corresponds to the angle between the first member 610 and the second member 620 when the measurement device is in the closed position and contacting (without significantly compressing) the sample material. The gap is measured by a variable resistor 665c that is attached to the clamping mechanism. The voltage drop across the resistor is related to the angle.

To correlate the thermal properties of the material sample, the gap is derived from the reading coming from the rotation of the pivot of the clamping mechanism 630. Voltage drop across the resistor is measured and correlated to the absolute gap from the material under test.

When the measurement device 600 is closed around the material sample, the two spring loaded wide-area contact elements 663a, 663b (note these provide surface areas creating elements of local pressure) are pushed against the material sample applying different pressures. The lower pressure wide-area contact element 663a compresses further than the higher pressure wide-area contact element 663b, and so the displacement of the two can be correlated to the compression of the material sample (e.g., based on a ratio or similar).

Figure 6B:
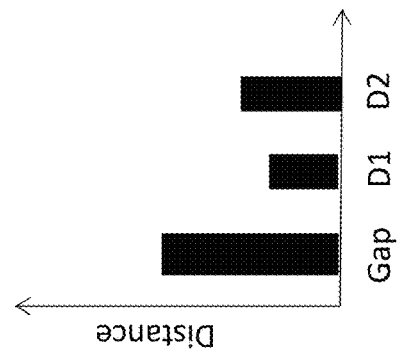

Note that the role of the spring-loaded wide-area contact element 663a could be combined with the spring load of the clamping mechanism 630—such that the spring load of the clamping mechanism (light load) is the spring load of wide-area contact element 663a and so the gap measurement is actually distance D1. Distance D2 may be still used to determine compressibility. Essentially, from knowing displacement data from any two locations under different pressures, compressibility can be determined for those prescribed conditions as shown in FIG. 6B. The compressibility as measured by the measurement device could be calibrated to a given displacement under a given pressure, or simply use a curve fit, or regression type relationship to help identify the material and its thermal resistance based on displacement data.

Many other mechanical arrangements (e.g., linkages, pivots, slides, and so on) and sensors may be utilized to determine the compressibility profile of the material under test. For example, the reactive force in the spring wide-area contact elements 663a, 665a could be correlated to the gap. The relative displacement of the wide-area contact elements 663a, 663b could also be determined using variable resistors, linear variable differential transformers, hall sensors, eddy currents, laser time-of-flight and/or capacitance based systems.

FIGS. 6C and 6D illustrate an alternative example of a measurement device 600' in which the clamping mechanism 630' includes a small servo motor 632 mounted at the hinge pivot location marked by P. For the purposes of this description, the term servo motor is a shorthand reference for any suitable motor, including position encoded motor, controllable motor with feedback, and so on. The servo motor may be used instead of or in addition to spring mechanisms in the clamping mechanism. The user places the material under test in between first and second members 610' and 620' and the measurement system is activated. The servo motor 632 closes the device 600' until the servo motor 632 detects contact with the material under test. Contact with the material sample may be done by sensing electromagnetic radiation. For example, the device 600' includes a electromagnetic radiation source element 663' and electromagnetic radiation sensor element 665a'. The measurement circuitry may be configured to determine when the electromagnetic radiation source sensor 665a' is blocked by contact with a solid (near-zero backscatter). The electromagnetic radiation source element 663' and electromagnetic radiation sensor element 665' may also be used to measure the thermal property of the material sample as described in FIGS. 2-4, but operated at a low power to detect contact. Contact with the sample could also be determined by mechanical sensor element 665b', which may measure strain, pressure or bending (for example) of the first member 610' which would change with contact. Proper contact with the material sample may be verified throughout the measurement process. There are various possible methods of determining contact.

Once contact with the sample is determined, the thickness can be gauged through knowledge of the servo motor position (pre calibrated, so using a lookup table for servo position vs gap). This is the uncompressed value of thickness. Other measurements from the various sensor arrays could be conducted here, in particular this location would be useful for the thermal system, where contact needs to be light, but definitely in contact. From this 'first contact' location, the servo motor could advance a known amount, thus compressing the material. Pressure measured by mechanical sensor element 665' could be used to determine the gap vs. pressure which would equate to compressibility. Measurements at 2 or more locations may be taken, as shown in the example data of FIG. 6D. This technique may provide advantages over the spring method described in FIGS. 6A-6B as it combines a measure of compressibility and thickness into one, and allows for more control over the clamp contact.

In one example, a strain gauge may be used to measure the reactive force across the clamping mechanism between the spring load and the material-spring load. Compressibility can be approximated by determining the reactive force of the material at a given spring rate provided by the clamping mechanism.

Thermal Energy-Based Material Properties

The material property measurement devices illustrated in FIGS. 1-6 utilize non-thermal energy such as electromagnetic radiation, sound, and mechanical energy, to determine a property of a material sample such as thickness, compressibility, thermal resistance, or material type. Using non-thermal energy to determine a property of a material provides many benefits including reduced power consumption, fairly quick measurement and analysis, and possibly some packaging advantages that make a handheld measurement device more feasible. FIG. 7 illustrates an exemplary measurement device 700 that uses thermal energy to determine a thermal property of a material sample. In spite of using heat, the measurement device 700 is suited for household use, portable, and capable of being held in hand as compared to laboratory thermal resistance measurement systems which are large, expensive, and slow.

FIG. 7 illustrates an exemplary measurement device 700 that includes first member 710, second member 720, and clamping mechanism 730. A material under test has been positioned between the first member 710 and the second member 720 and the members are held in the closed position by the clamping mechanism 730 exerting sufficient pressure to contact the material under test without significantly compressing the material. An environmental sensor 705 is configured to measure an environmental characteristic, such as temperature and/or humidity, of the environment surrounding the device 700. The measurement device 700 utilizes heat to determine a thermal property of the material under test.

Heat source element 763 is a heated plate. In one example, the heat source element 763 is a highly resistive wire that heats quickly when current is applied. The thermal mass of the heat source element 763 should be small, so it can heat up quickly with little thermal inertia and robust enough such that it operates consistently over repeated use. A heat sensor element 765 is a thermocouple or other temperature measurement device with suitable response and accuracy precision (such as TMP36, thermocouple, infrared sensor, resistance temperature detector, and so on). The heat source element 763 and heat sensor element 765 are loaded against the material with a known and constant pressure coming from the clamping mechanism. Second member 720 includes insulated backing material indicated by the shading. The insulated backing material could be any insulator, most likely plastic/air that surrounds the heat source element 763 and should be sufficiently sized to adequately limit the influence of the ambient environment on performance.

During measurement, the heat source element 763 is fed a controlled burst of energy from a power supply (battery) as shown in FIG. 7A. The heat sensor element 765 is mounted in the first member 710 and so is spring loaded against the material. The distance between the heat source element 763 and the spring loaded heat sensor element 765 is a function of the first compressibility of the material. The clamping mechanism puts the temperature measurement device in contact with the top of the material under test sample. The heat sensor element 765 should be an area-type sensor (e.g., having sufficient area). The heat sensor element 765 should not be a point-probe type, as it should be measuring the temperature rise of an area of material, to remove the effect of non-homogeneity in the material. Both heat source element 763 and heat sensor element 765 should operate over an area, for example, of 20 mm$^2$ min in order to accurately and representatively capture the thermal resistance of the material under test.

Voltage/data from heat sensor element 765 (see FIG. 7B) is measured and correlated to the thermal resistance of the material under test (calibrated beforehand using an ASTM recognized instrument). Analysis circuitry (not shown) may store and read a look-up table or regression/curve fit that maps the gradient of the temperature data as correlated with thermal resistance (see FIG. 7C). In one example, an amount of time taken to pass a threshold temperature is measured, which approximates a gradient. Note that a measure of thickness and compressibility may help correlate this method to thermal resistance, although thickness and compressibility is not required for a simple approximation.

Using this thermal measurement technique alone or in combination with another non-thermal measurement technique provides several benefits. For example, the thermal measurement technique measures the thermal resistance of the entire insulation layer (not just what the sensor element touches). By having the temperature sensor on the other side of the material (relative to the heated bed), if the material were to be composed of multiple layers, the entire composite thermal resistance is measured. The thermal measurement technique measures more than just conductance, a property that can dominate with reflectance methods like transient hot plate, and other one-sided touch/measure implementations One sided methods can struggle with thin samples (e.g., clothing) and may produce erroneous results when a foreign object (or a significant air gap) is inadvertently in contact with the sample. However, the described measurement device includes first and second members that contact both sides of the sample, reducing the risk of a foreign object being included in the measurement.

In the device 700 the heat sensor element 765 on the other side of the material/heater moves with the thickness and the thickness can be measured. Thus the distance from heated plate to thermocouple will vary due to thickness and the thermal measurement technique will not include an air gap that would have to be calibrated out. With this method acceptable data can be obtained with just one heat burst (note that with transient plane more than three repetitions are recommended).

The thermal measurement technique is easily combined with other absorption/transmission measurements, like electromagnetic radiation and sound. The thermal measurement technique can easily be achieved with a simple heater and temperature measurement device and can be implemented with less expensive, low precision electronics. This is in contrast to transient plane type one-sided methods that are reported to require very high precision resistance measurement devices for temperature measurement and heat control. Because thermal resistance is measured along with thickness and other non-thermal data, partial material identification is possible (unlike transient plane method). For example, a material sample with a certain gradient temperature rise, and known thickness can be correlated to a fleece, or a cotton sack, or differentiated from another material with the same thickness but different gradient for example.

If a thermocouple (or other similar temperature measurement device) is added to the heater plate, the measurement system could double check the amount of energy provided to the heater, and would improve precision for little cost. Data from this sensor could be used in the calibration scheme. The thermocouple could also be used as a temperature probe when the measurement device is fully opened as illustrated in FIG. 1E. The first member may be held against a surface to measure a temperature of the surface (e.g., a person's forehead, an outside surface of a sleep sack, and so on).

In a first calibration scheme, gradients of temperature rise are recorded for known thermal resistance materials. Results from materials under test are compared to that data (or a regressed fit of it) and matched to an equivalent thermal resistance value. A database of materials is accessed to identify a material that has that gradient value, and that thickness, and see if a match exists that identifies its probable structure (polyester fleece vs bamboo weave, for example).

In a second calibration scheme a series of calibrations are taken at different device gap settings (a priori), with only air between the heated plate and thermocouple, at a selection of ambient conditions. The temperature reading initially taken prior to the heat burst is used to select a calibration profile, or interpolate between using a fit. The recorded value of temperature rise variation with respect to time (gradient) is subtracted from the calibration gradient to give the thermal resistance gradient of the material under test. This value is then compared to a calibration to determine the absolute thermal resistance of the material.

For example, the thermal resistance of material under test may be determined as $T_{Res}$ (air at same gap)–$T_{Res}$ measured. This technique is especially useful for thermal resistance values greater than 0.3 ($Km^2/W$). If a higher temperature difference is created by increasing energy burst per unit time data quality will likely improve.

Figure 7D:
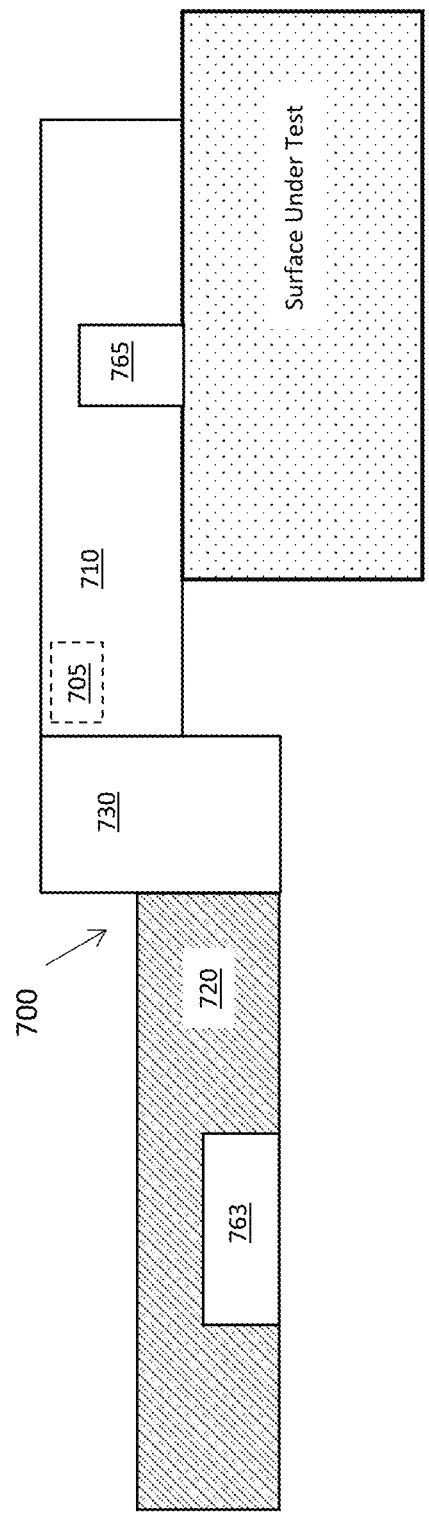

FIG. 7D shows the apparatus 700 with the clamping mechanism 730 in the fully open condition. This exposes the temperature measurement sensor 765 and allows the entire assembly to be held against a material under test (or the skin of a person) by the user, rather. This allows the device to be used as a temperature measurement probe. In one example, the device 700 is temporarily used in the open-hinge condition to measure the temperature of the exterior surface of a material (sleep sack or similar) while in occupancy. Swiping the temperature measurement device 765 over an area of the exposed material for a short period of time (1-10 seconds) and collecting various statistical parameters (e.g. maximum, minimum, median, and mean temperatures) allows for accurate determination of the external surface temperature conditions. In one example, instead of a thermocouple, a thermal imaging system is used to determine the temperature of the surface under test and/or the temperature of the occupant.

The external temperature values may be operated on with the current ambient room temperature value, the measured or assumed internal temperature of the material and the predetermined thermal resistance value of the material under test. Algorithms designed to calculate the heat flux conditions may then be used to determine if existing heat-loss condition is within acceptable, predetermined, and preprogrammed limits. The results may be presented to the user along with recommendations suggesting better clothing material, layette, or ambient temperature/condition choices.

In the simplest case, data detailing the temperature condition of the material external to the occupant, or the occupant itself may be used to provide recommendations to the caregiver, in absence of the knowledge of thermal resistance values. In one example, where an occupant is shown to register a body temperature in excess of predetermined limits, recommendations could be made to check the occupant for signs of a fever, or to simply try a less insulative clothing selection.

Conductance-Based Non-Thermal Material Properties

Figure 8:
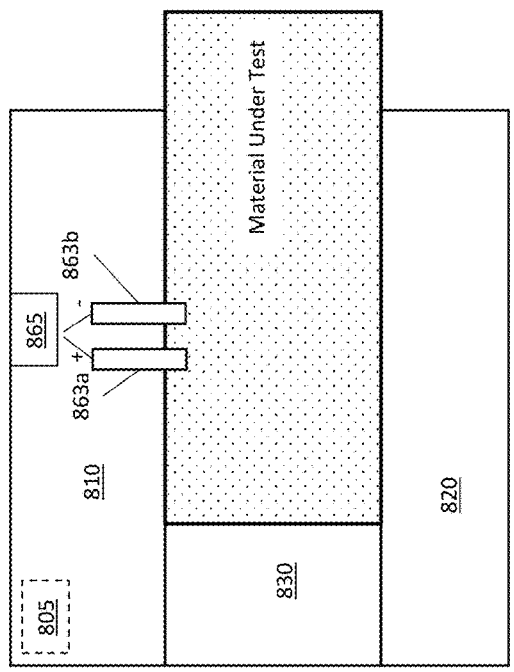
FIGS. 8 and 8A illustrate an exemplary material property measurement device in accordance with various aspects described.

The moisture content of a material sample may significantly impact its thermal properties as well as comfort in wearing the material sample. Therefore, it may be useful for the measurement device to be able to determine the moisture content of the material sample. FIG. 8 illustrates an exemplary measurement device 800 that includes first member 810, second member 820, and clamping mechanism 830. A material under test has been positioned between the first member 810 and the second member 820 and the members are held in the closed position by the clamping mechanism 830 exerting sufficient pressure to contact the material under test without significantly compressing the material. An environmental sensor 805 is configured to measure an environmental characteristic, such as temperature and/or humidity, of the environment surrounding the device 800. The measurement device 800 utilizes electrical conductance to determine the moisture content of the material under test.

Electrical source elements first and second electrodes 863a, 863b are disposed in first member 810 so that the electrodes contact a material sample. An electrical sensor element ohmmeter 865 measures a conductivity of the material as a function of the resistance between the two electrodes 863a, 863b, which are held at fixed distance from each other, as current tries to pass in between. As an alternative to electrodes, the electrical source elements 863a, 863b could be probes, or a plate type configuration (such as a swirl printed onto a flat). In one example, a capacitance method can be used for measuring moisture content of the material by probing the dielectric properties of the material.

Figure 8A:
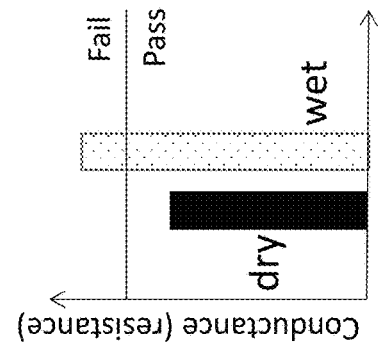

During moisture content measurement, the first and second electrodes 863a, 863b are put in contact with the material under test by the spring pressure provided by the clamping mechanism 830. The resistance of the material is measured by providing constant current to the electrodes. As shown in FIG. 8A, the conductance/resistance of the material varies with moisture content.

Different materials inherently have different conductivity/resistivity and so the measured resistance could be used in collaboration/synergy with other measurement techniques discussed herein to help identify a material-type, as well as a material's thermal resistance. Moisture content might influence the electromagnetic radiation and sound propagation and so the resistance measure might be used to correct data collected from those sensor systems. In one example, the moisture content test is used as a pass fail criteria displayed on the measurement device, and not necessarily for precision identification. In this manner the moisture content measurement may be a check that the material is not too wet for use. The material's conductivity may also be used to determine that the material under test does not contain uncomfortable (e.g., metallic, foil) elements and provide an alert when the conductance indicates an uncomfortable material is being tested, regardless of the thermal property that is determined.

In addition to the thermal properties of a garment or blanket worn by a baby during sleep, the hardness of a sleep surface is also an important consideration for a caregiver. When the measurement device is used by a caregiver, it may also be advantageous for the measurement device to also be capable of determining a softness or hardness (in terms of elasticity) of a surface and display information related to the suitability of the surface for sleeping babies.

Figure 9:
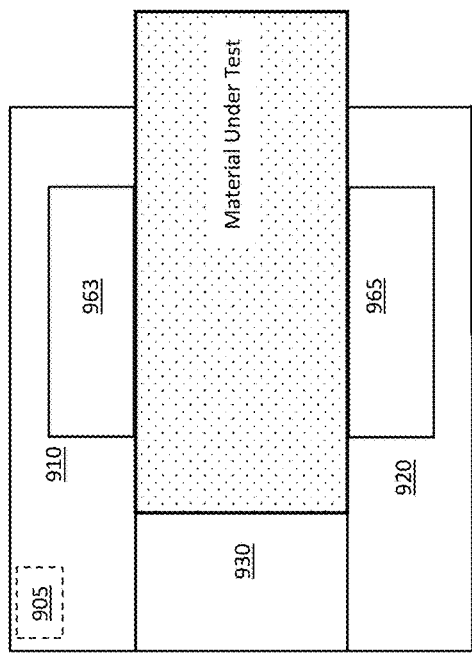
FIGS. 9 and 9A illustrate an exemplary material property measurement device in accordance with various aspects described.
Figure 9A:
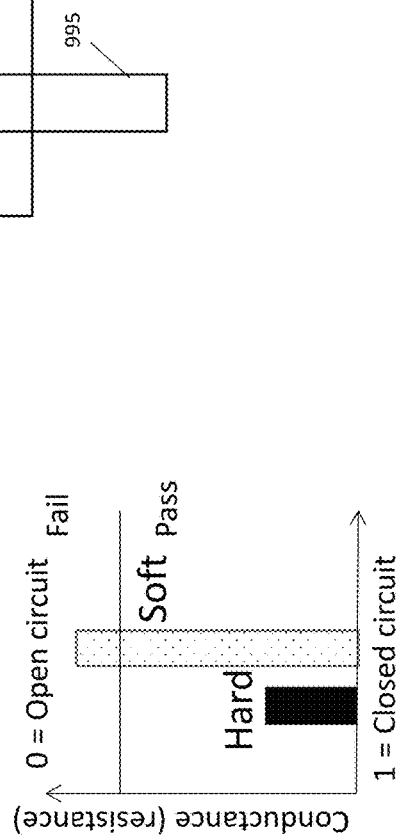

FIG. 9 illustrates an exemplary measurement device 900 that includes first member 910, second member 920, and clamping mechanism 930. A material under test has been positioned between the first member 910 and the second member 920 and the members are held in the closed position by the clamping mechanism 930 exerting sufficient pressure to contact the material under test without significantly compressing the material. An environmental sensor 905 is configured to measure an environmental characteristic, such as temperature and/or humidity, of the environment surrounding the device 900. The measurement device 900 utilizes one or more source elements 963 and sensor elements 965 and measurement techniques described with reference FIGS. 2-7 to determine a thermal property of the material under test.

To measure the softness of a surface, the device 900 includes a durometer mechanism 990 extending from an outside surface of one of the second member 920. The durometer mechanism includes a spring 993 having a predetermined spring constant and a probe 995 disposed at a distal end of the spring 993. Measurement circuitry (not shown, see FIG. 10) is configured to determine durometer data based on a compression of the spring. Analysis circuitry (not shown, see FIG. 10) is configured to determine a surface suitability based on the durometer data and display information related to the surface suitability.

A spring loaded switch (not shown) in the durometer mechanism is compressed as the probe 995 is pressed onto the surface. If the probe 995 is loaded against a surface and the spring 993 could not be compressed enough to close the switch, the material would be classified as being too soft. If the spring 993 could be compressed enough to close the switch, the material would be classified as being suitable for sleep.

While the preceding description illustrates various examples of the measurement device including a single thermal property measurement technique (e.g., non-thermal measurement techniques using electromagnetic radiation, sound, mechanical energy, electrical energy as well as thermal energy techniques), in some examples, the measurement device includes source elements and sensor elements for multiple measurement techniques. Data from the various measurement techniques may be combined to determine a thermal property of the material, classify a material type, and/or determine the suitability of material for a given environment. A multi-variate space (e.g., embodied in a lookup table or mathematical correlation expression) may be used to map data values from various measurement techniques to a single thermal resistance and/or material identity type.

While an environmental sensor element is included so that a garment's suitability with respect the present environment, in some situations, a caregiver may want to select a garment that is suitable for a different temperature/humidity. For example, when a caregiver is going to take a baby to a park, the caregiver may use the device to enter a predicted temperature. The analysis circuitry then determines the suitability of the tested garment for the entered temperature and/or displays stored garments having thermal properties mapped to the entered temperature. In another example, the device may access weather information and provide the predicted temperature to a user or automatically use the predicted temperature for the suitability analysis.

The type of material may affect how measured non-thermal or thermal data may map to a thermal resistance. Therefore determining the type of material may be useful in improving the accuracy with which a thermal resistance is determined using the above described techniques. The plot on the left side of FIG. 10 illustrates how an electromagnetic radiation profile varies according to material types, meaning that the profiles can be used to classify types of materials. The graph on the right FIG. 10 illustrates an example of how a combination of electromagnetic radiation and acoustic measurement data as well as a measured thickness of the material can be used to classify a material type. Other combinations of profiles measurement data could be used to identify material type. At the bottom of FIG. 10, image data taken by a camera as described in FIG. 4 can be used to identify patterns characteristic of fleece as compared to woven cotton.

For the purposes of this description, the term "material," "material sample," "fabric," "material type," "fabric type," or "garment" should be construed as including a single layer of a homogeneous material; a composite material that includes more than one component; a layered article that, as manufactured includes layers of different material types (e.g., nylon shell overlaying a fiber fill); or a collection of layers of materials stacked together by a user of the measurement device. The measurement device may determine the thermal property of any material sample that it contacts, regardless of the layers or differing components of the material. Recall that the measurement device may also be able to combine separate measurements made for different separate layers of a layette or outfit into a composite thermal property value.

Figure 11:
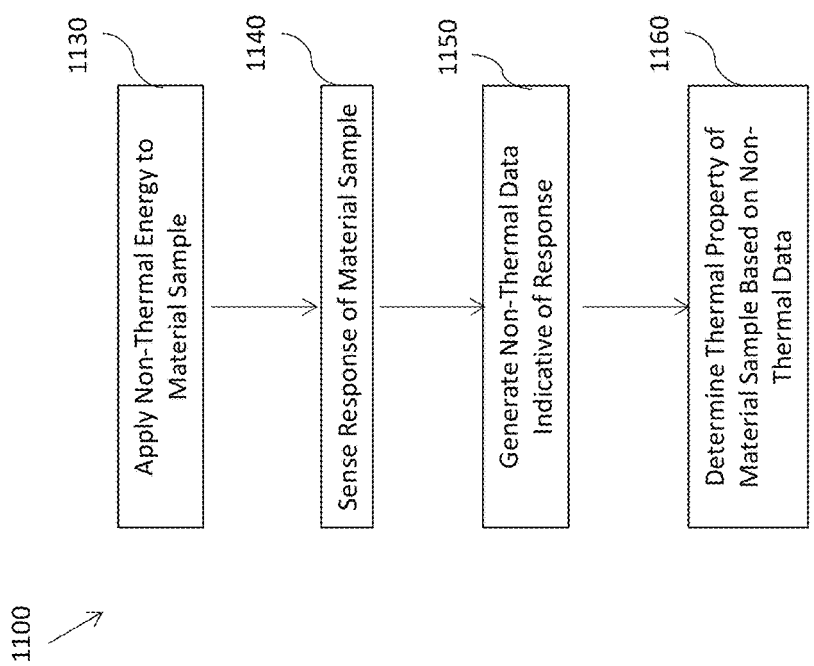
FIG. 11 illustrates an exemplary material property measurement method in accordance with various aspects described.

FIG. 11 illustrates a flow diagram outlining an exemplary method 1100 for determining a thermal property of a material sample with a measurement that includes a first member and a second member. At 1130 the method includes applying non-thermal energy to a first side the material sample using a source element on the first member. At 1140 the method includes sensing, with a sensor element on one or both of the first member and the second member, a response of the material sample to the non-thermal energy. At 1150 the method includes generating, with the measurement device, non-thermal data indicative of the response. At 1160 the method includes determining a thermal property of the material sample based on the non-thermal data. Examples of non-thermal energy include electromagnetic radiation, sound, mechanical, and electrical.

Figure 12:
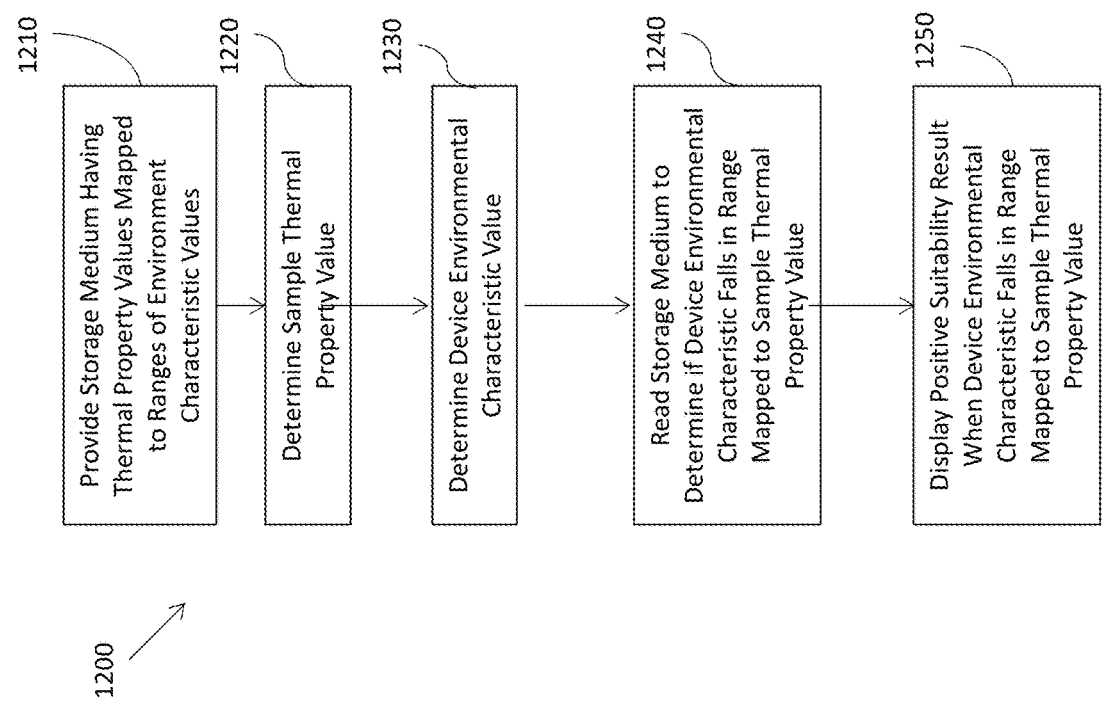
FIG. 12 illustrates an exemplary material property evaluation method in accordance with various aspects described.

As discussed above, determining a suitability of a given material for a given environment can be helpful to a caregiver of an infant, baby, child, teen, or adult incapable of providing feedback on their comfort. FIG. 12 illustrates a flow diagram outlining an exemplary method 1200 for providing suitability feedback to a user of a device. The method includes, at 1210, providing, in a measurement device, a storage medium having thermal property values mapped to ranges of environment characteristic values. At 1220 the method includes determining, with the measurement device, a sample thermal property value of a material sample. Any combination of the measurement techniques described in FIGS. 2-9 can be used to determine the thermal property value.

At 1230 the method includes determining, with the measurement device, a environmental characteristic value (e.g., a temperature and/or humidity of the room in which the device is present). In one example, the device may receive a temperature/humidity entered by way of a user interface displayed on the indicia circuitry (including, optionally, a connected mobile communication device). At 1240 the method includes reading the storage medium to determine if the environmental characteristic value falls within a range of environmental characteristic values mapped to the sample thermal property value. At 1250 the method includes displaying a positive suitability result when the environmental characteristic value falls within the range of environmental characteristic values mapped to the sample thermal property value.

Figure 13:
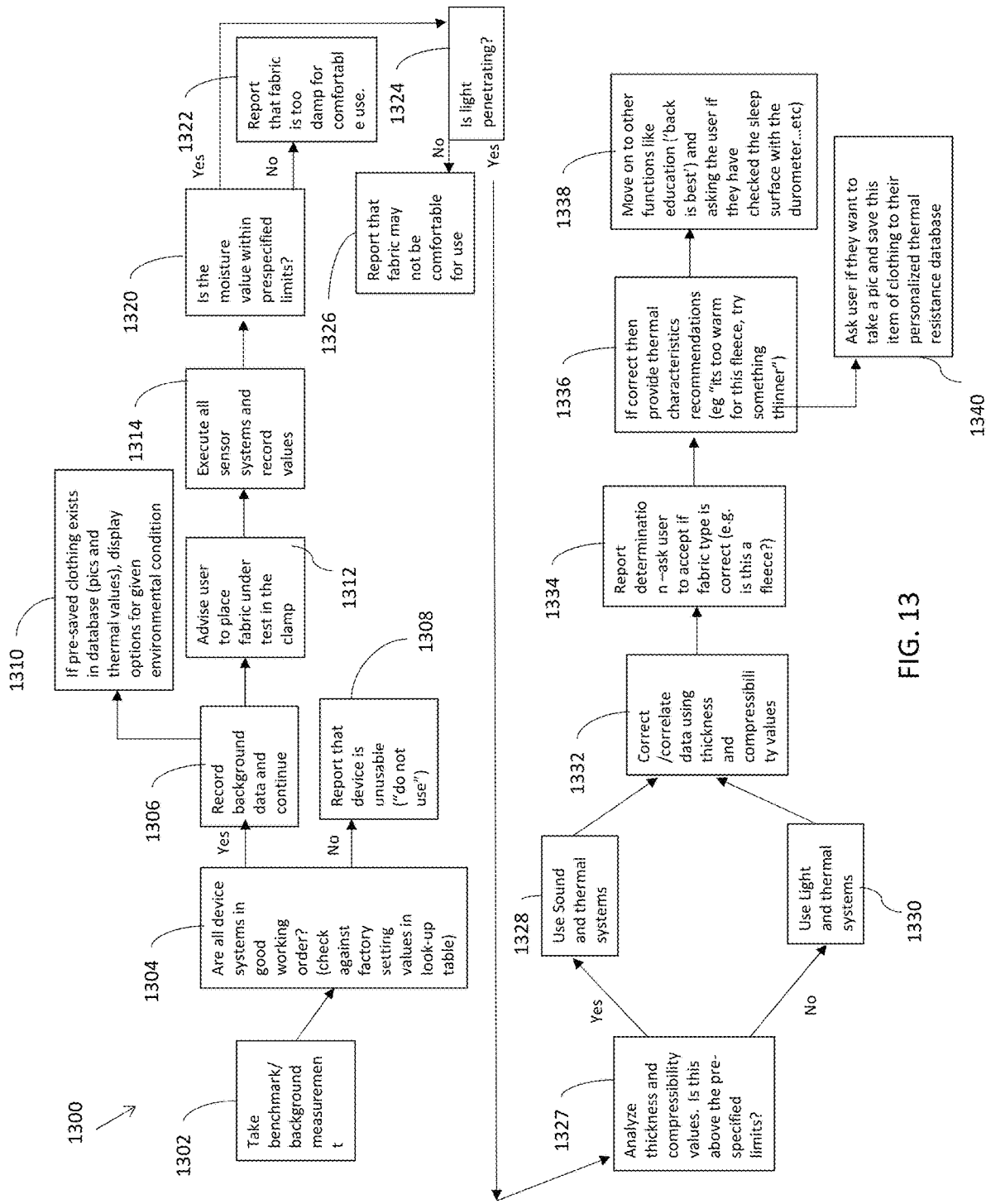
FIG. 13 illustrates an exemplary material property measurement method in accordance with various aspects described.

FIG. 13 illustrates a flow diagram of an exemplary method 1300 that may be performed by a measurement device as described above. At 1302 the method includes taking benchmark/background measurements. At 1304 a determination is made as to whether all systems are in good working order. If not, at 1308 the device displays an indication that the device is not usable. When the device is determined to be functioning properly, at 1306 the method includes recording environmental data (e.g., temperature/humidity). At 1310 the method includes displaying saved garment options having thermal resistance values appropriate for the environmental condition. If no garment is appropriate or the user chooses to continue without selecting a saved garment, at 1312 the method includes prompting the user to place the sample material within the first and second members of the device. At 1314, the method includes executing all sensor systems to perform one or more measurement techniques.

At 1320 a determination is made as to whether the moisture content of the garment is above a specified limit. If so, at 1322 the method includes reporting (via indicia circuitry) that the material is too damp for comfort. If the material is not too moist, at 1324 a determination is made as to whether electromagnetic radiation penetrates the sample material. If electromagnetic radiation does not penetrate, meaning it may be non-breathable, at 1326 the device reports that the material may not be comfortable. At 1327, the method includes analyzing the thickness and compressibility of the material to determine whether the material is "thick" or "thin" based on some predetermined limits on thickness. If the material is thick, at 1328 data from the sound and thermal systems are selected. If the material is thin, at 1330 data from the electromagnetic radiation and thermal systems are selected. At 1332, the selected data is corrected/correlated based on thickness and compressibility. At 1334 a material type is identified and displayed for the user to confirm. At 1336 the suitability of the garment is reported and at 1340 the user is prompted to save the item of clothing, mapped to the determined thermal resistance, for future access. At 1338, the method includes other functions such as displaying educational messages or prompting the user to measure the softness of the sleep surface.

Figure 14:
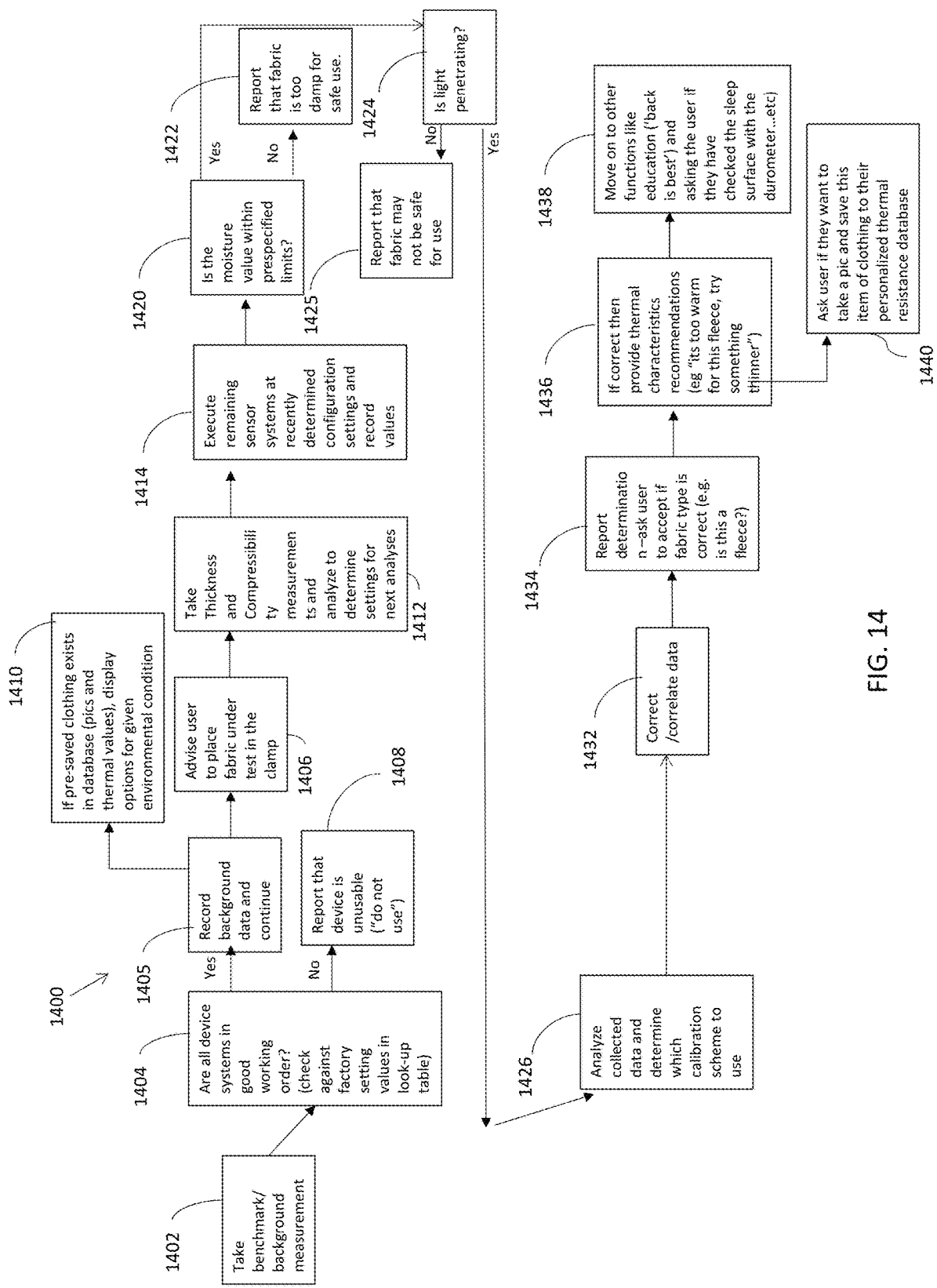
FIG. 14 illustrates an exemplary material property measurement method in accordance with various aspects described.

FIG. 14 illustrates an alternative method 1400 that may be performed by the thermal property measurement device described herein. At 1402 the method includes taking benchmark/background measurements. At 1404 a determination is made as to whether all systems are in good working order. If not, at 1408 the device displays an indication that the device is not usable. A system status check could include an "open air" test of the device (e.g., with no material sample within the members). Sensor values can be compared with stored values to determine that all systems are functioning properly.

When the device is determined to be functioning properly, at 1405 the method includes recording environmental data (e.g., temperature/humidity). At 1410 the method includes displaying saved garment options having thermal resistance values appropriate for the environmental condition. If no garment is appropriate or the user chooses to continue without selecting a saved garment, at 1406 the method includes prompting the user to place the sample material within the first and second members of the device. At 1412 the method includes taking thickness and compressibility measurements of the material. At 1414, the method includes executing remaining sensor systems to perform one or more measurement techniques as determined based on the thickness and compressibility.

At 1420 a determination is made as to whether the moisture content of the garment is above a specified limit. If so, at 1422 the method includes reporting (via indicia circuitry) that the material is too damp for comfort. If the material is not too moist, at 1424 a determination is made as to whether electromagnetic radiation penetrates the sample material. If electromagnetic radiation does not penetrate, meaning it may be non-breathable, at 1425 the device reports that the material may not be comfortable. At 1426 the method includes analyzing collected data and determining a calibration scheme to use. At 1432 the collected data is corrected or correlated based on the calibration scheme determined at 1426. At 1434 a material type is identified and displayed for the user to confirm. At 1436 the suitability of the garment is reported and at 1440 the user is prompted to save the item of clothing, mapped to the determined thermal resistance, for future access. At 1438, the method includes other functions such as displaying educational messages or prompting the user to measure the softness of the sleep surface.

Figure 15A:
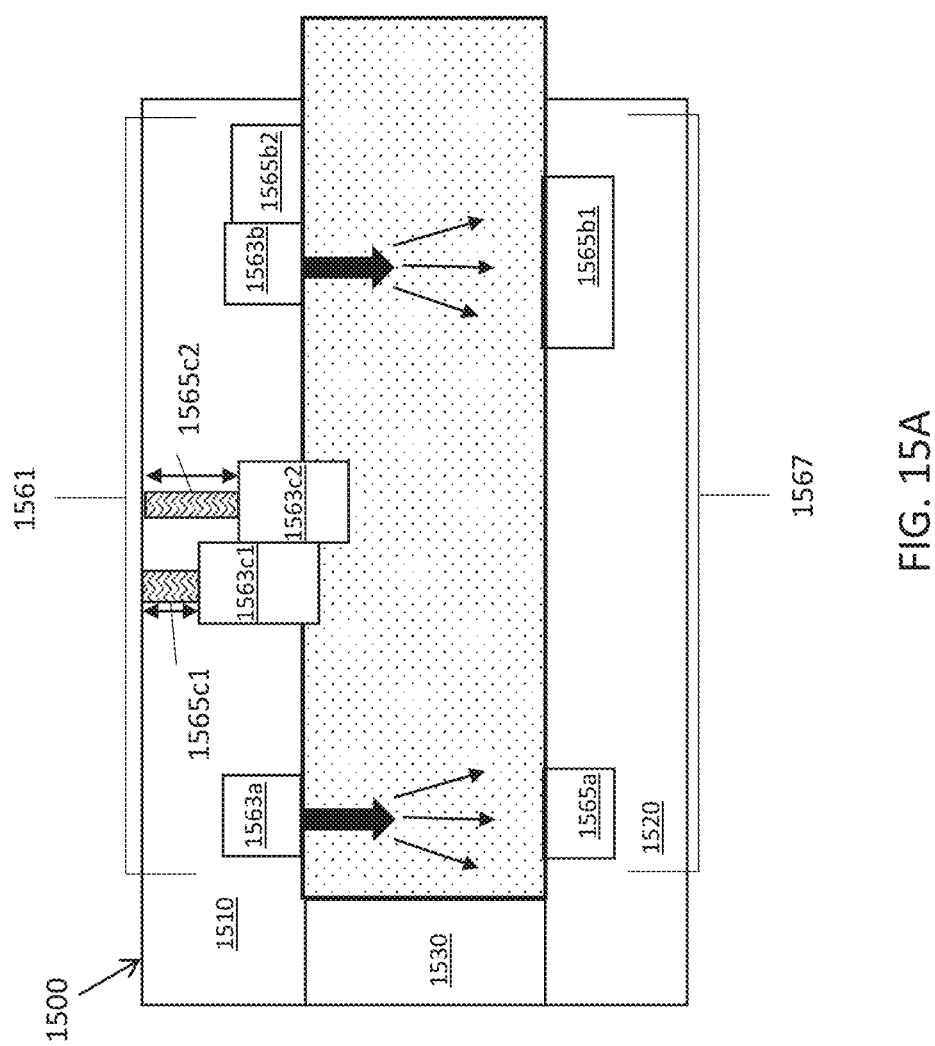
FIG. 15A illustrates an exemplary material property measurement device in accordance with various aspects described.

FIG. 15A illustrates an exemplary measurement device 1500 that utilizes arrays of source elements and sensor elements to perform several measurements including non-thermal measurements on the material under test. The device 1500 includes first member 1510, second member 1520, and clamping mechanism 1530. A material under test has been positioned between the first member 1510 and the second member 1520 and the members are held in the closed position by the clamping mechanism 1530 exerting sufficient pressure to contact the material under test without significantly compressing the material. The measurement device 1500 includes a first array 1561 of source elements 1563*a*, 1563*b*, 1563*c*1, and 1563*c*2 mounted in the first member 1510 and the second member 1520 includes a second array 1567 of sensor elements including 1565*a* and 1565*b*1. The measurement device 1500 includes an electromagnetic radiation measurement system with electromagnetic radiation source element 1563*a* and electromagnetic radiation sensor element 1565*a*, a vibration measurement system with vibrator element 1563*b* and accelerometers 1565*b*1, 1565*b*2, and a compression measurement system with spring-loaded wide-area contact elements 1563c1, 1563c2 and distance sensor elements 1565c1, 1565c2.

To determine a thermal property of the material under test, as described above in more detail in the separate sections for each measurement technique, the measurement device 1500 activates electromagnetic radiation source element 1563a measures electromagnetic radiation passing through the material sample with electromagnetic sensor element 1565a. The measurement device 1500 activates vibrator element 1563b measures a mechanical response of the material sample with accelerometer 1565b. The measurement device 1500 measures the compressibility of the material sample using distance sensor elements 1565c1, 1565c2. The different measurements may be performed simultaneously or according to some sequence.

In addition to the illustrated combination, the source elements in the array 1561 may include sources capable of emitting electromagnetic radiations such as infrared, heat and visible light, a speaker configured to emit acoustic radiation such as sound or mechanical vibrations, and mechanical members configured to apply physical pressure (e.g., for measuring compression). The array 1561 in the first member 1510 also includes sensor elements 1565b2, 1565c1, and 1565c2.

In addition to the illustrated combination, the sensor elements may include sensors required to measure displacement such as hall effect, capacitance sensors, resistive sensors, lasers or strain gauges. The sensor elements may also include force measuring sensors, accelerometers, microphones, temperature measuring devices, photodiodes, photodiode arrays, photoresistors, capacitance probes, and various spectrum cameras. The arrays 1561, 1563 may be controlled to simultaneously, or according to some predetermined sequence, activate the source elements and the sensor elements. The arrays 1561, 1563 may include source elements and sensor elements associated with any of the measurement techniques described above in addition to or instead of the source elements and sensor elements illustrated in FIG. 15A.

Figure 15B:
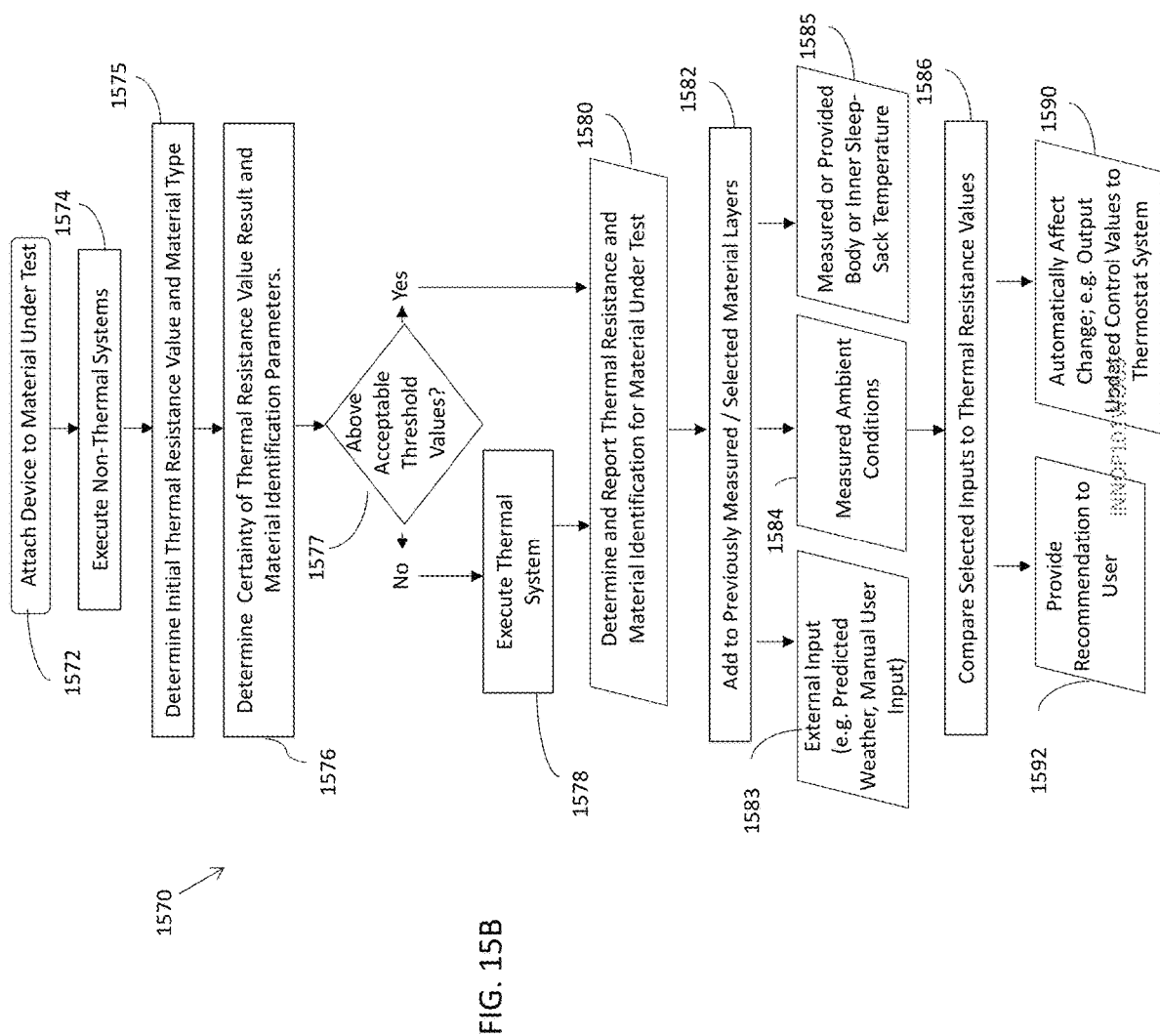
FIG. 15B illustrates an exemplary material property measurement method in accordance with various aspects described.

FIG. 15B illustrates a flow diagram outlining an example method 1570 that may be used by a measurement device that includes multiple measurement techniques as with the device 1500 of FIG. 15A. At 1572, the method includes attaching the device to the material under test. At 1574, the method includes executing non-thermal measurement systems (e.g., electromagnetic radiation, vibration, compression, and so on). At 1575, the method includes determining a thermal resistance value and material type based on the measurement data from the various non-thermal measurement systems. At 1576, the method includes determining a certainty of the thermal resistance value and material type identification. This may be performed by determining a fit between the measurement data from the different measurement systems and stored measurement data for the determined thermal resistance value and material type (see, e.g., FIG. 10). At 1577, a determination is made as to whether the certainty is above a threshold. If not, at 1578 the method includes executing a thermal measurement system and at 1580 all data (including thermal data if obtained)) is used to determine thermal resistance and material identification. At 1582, the method includes adding the thermal resistance to a thermal resistance of any previously measured layers.

At 1583-1585 a temperature input is selected for determining the suitability of the material is determined using one or more options in parallel. At 1583 an external temperature input (not from an onboard sensor) is received for use to determine suitability. At 1584 the ambient temperature is measured by an onboard sensor. At 1585 a body temperature or inner sleep sack temperature is either measured or received. At 1586, the method includes comparing the selected temperature input with the thermal resistance value. At 1592, the method includes providing a recommendation to a user (e.g., whether or not the material layer(s) provide a suitable thermal resistance for the selected temperature input). At 1590, the method includes automatically affecting a change to the environment to make the environment more suitable for the thermal resistance (e.g., adjusting thermostat).

FIG. 15B shows that data collected by the device may be operated on simultaneously or synchronously using a variety of algorithms to relate physically measured parameters to thermal resistance approximations. Data from the system in its entirety provides information relating to the physical properties of the material under test such as, fiber type, fiber size, fiber blend, thickness, compression ratio, density, surface impedance, conductance, elasticity, airflow resistance and porosity. Thermal resistance is a function of the physical composition and microstructure of the material(s) under test and so correlating data from various measurements probing these physical properties to thermal resistance is possible using non-thermal techniques. Where determination is not possible, above a previously specified threshold value, a thermal technique is deployed. Data from this system will be noisy as measuring heat-flux in non-laboratory conditions is not ideal. However, this data combined with the data from the other non-thermal inputs allows for the acceptable threshold to be exceeded and determination of the predicted thermal resistance of the material under test to be reported. At this point the predicted thermal resistance values can be added to previously measured thermal resistance values if a layette is being created.

In one example, the system compares the predicted thermal resistance value of the material under test with others stored in a database and provides recommendations of multiple possible layering options that could match the predetermined ambient condition ensuring that the entire clothing ensemble is thermally matched for the ambient conditions in which it is to be deployed. In another example the system operates based on knowledge of environmental conditions alone and does not need to test a material. It compares the predicted, measured or otherwise inputted environmental conditions with a database of clothing detailing recorded thermal resistance values and creates multiple clothing options for the user to choose from. In this way the clothing ensemble can be selected by the user, allowing for style or other preference to be observed, while still optimally matching the thermal resistance of the layette for the environment in which is it will ultimately be deployed.

The device may operate based on temperature measurements taken from the local environment using its onboard systems, or using external inputs regarding predicted weather, or from manual user inputs can be used in the comparison to the measured thermal resistance values. Comparison can also be made from other temperature measurements provided to the system which may be a measured core body temperature, or the current temperature inside a sleep sack, for example. Input values of ambient conditions are ultimately compared with predicted thermal resistance values, and recommendations are provided to the user. In one example, the system automatically updates a thermostatic control system using the result of the comparison to ensure the ambient conditions within the local environment are matched to the thermal resistance of the selected layette. In another example, after the baby is dressed the measurement device may be clipped to a car set or stroller so that the ambient temperature continues to be measured and compared to the last determined thermal resistance. When the ambient temperature falls outside the range mapped to the thermal resistance, a temperature alert may be provided by indicia circuitry.

Figure 16:
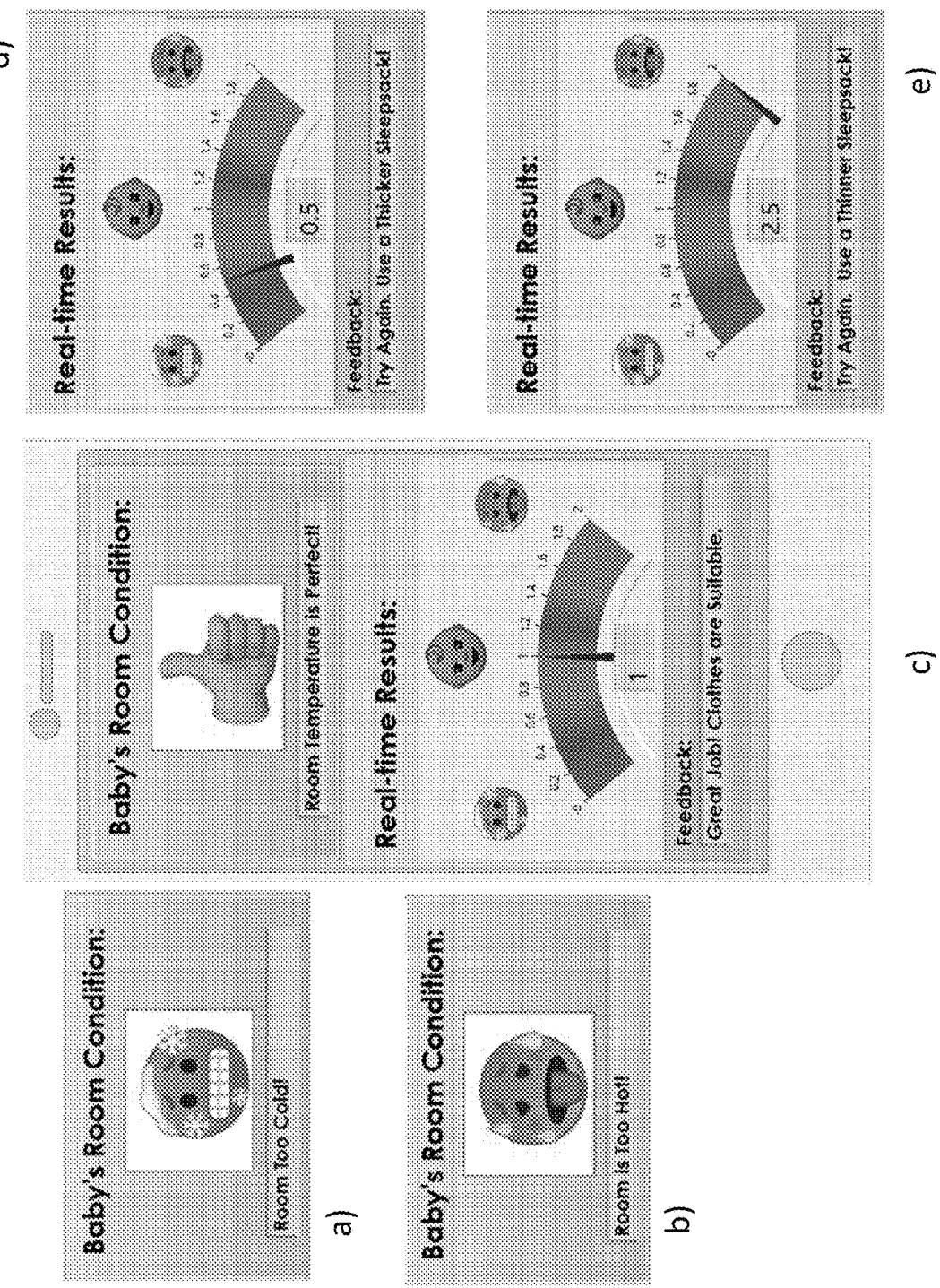
FIGS. 16 and 17 illustrate exemplary displays/user interfaces for a measurement device in accordance with various aspects described.

FIG. 16 illustrates several examples of displays/user interfaces that may be presented on indicia circuitry (e.g., on the measurement device or on a mobile communication device as illustrated). Example 'a' indicates that a caregiver has the room temperature set too cold for comfortable sleep, even though the thermal property of the selecting clothing's material is suitable for the temperature. Example 'b' indicates that a caregiver has the room temperature set too hot for comfortable sleep, even though the thermal property of the selecting clothing's material is suitable for the temperature. Example 'c' indicates that the caregiver has the room temperature set in an acceptable range and has selected a garment or garments that are suitable for comfortable sleep. Example 'd' displays the result of the caregiver selecting clothes that would not provide sufficient thermal resistance for the ambient temperature. A recommendation is given to try something that would make the baby warmer. Example 'e' displays the result of a caregiver testing a garment that would overdress the baby for the ambient temperature. The caregiver is advised to try clothing that would make the baby cooler.

In examples 'c'-'e' a "normalized" representation of the thermal suitability of the measured garment for the present environment is displayed as a number in which 1.0 indicates a "perfect" match between the garment and the environment. In example 'd' the normalized representation is 0.5 which indicates that the garment is insufficiently warm. Likewise in example 'e' the normalized representation is 2.5 which indicates that the garment is significantly too warm for the environment.

Figure 17:
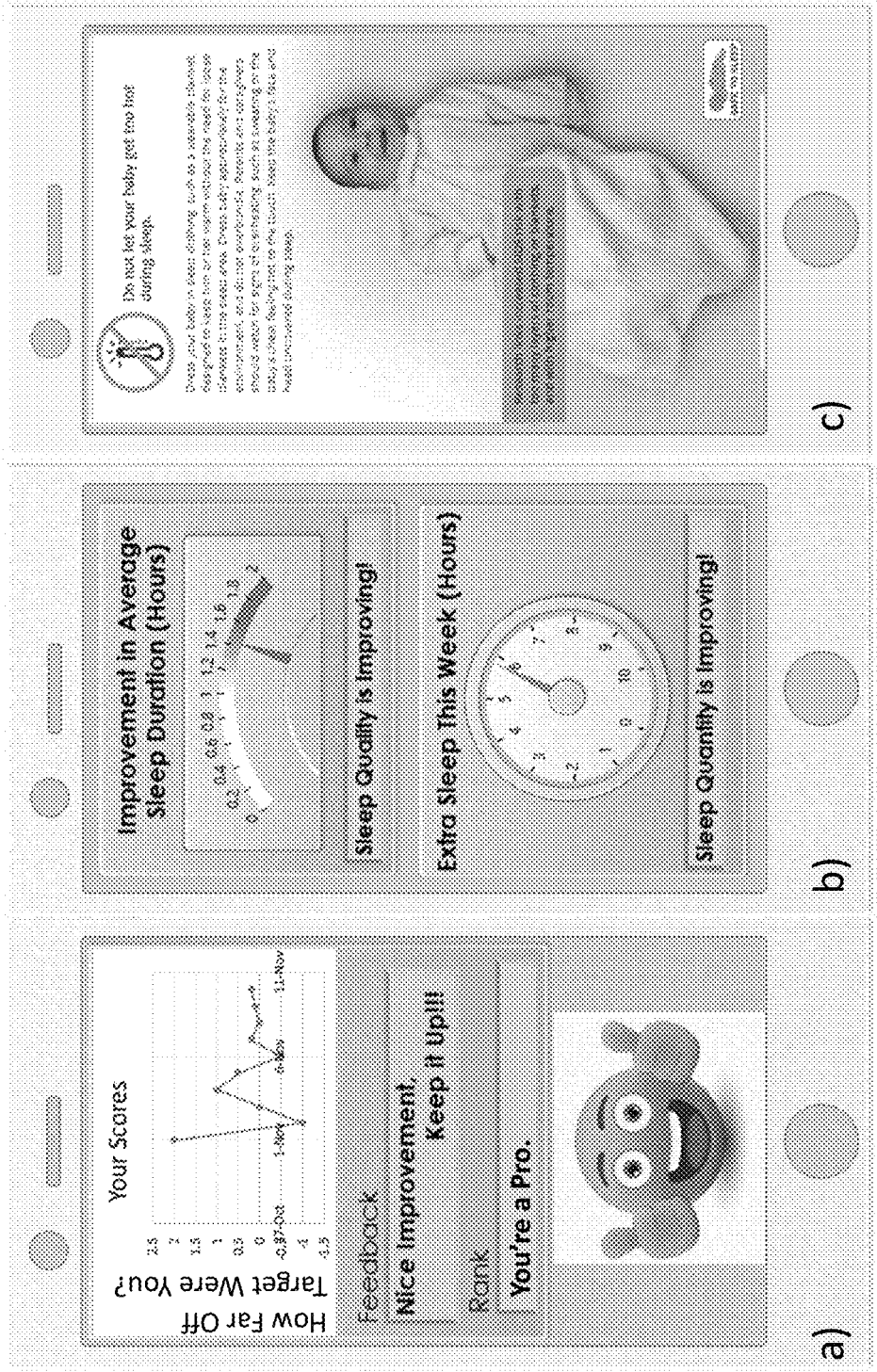

FIG. 17 'a' reports a game-based trend of the suitability of clothing selected by the caregiver over a period of time to show improvement and gamify the suitability interaction. This feature records a caregiver's garment suggestions and compares the thermal resistance of the suggested garments to the room temperature. A score is given in relation to how close the thermal resistance of the suggested garment is to an ideal thermal resistance. Scoring trends are determined based on stored usage data and a "ranking" is determined based on the score. Example 'b' reports a quantification of the improvement in a baby's sleep obtained by choosing suitable clothing and maintaining optimal room temperature. In order to use this feature, the user may be prompted to quantify the quality of sleep or other parameter on a periodic basis so that the quality quantification may be correlated with the suitability of the selected garment. This will cause recordation of the quantification in usage data as shown in FIG. 1C. FIG. 17 'c' displays an example of potential education provided to the user to remind them of the most up to date recommended sleep practices.

In one example education is delivered to the user based on specific learnings made through operation of the device. Where recorded historical data suggests a preference to overdress an infant exists, education would be selected and administered explaining the dangers of overdressing and helping the user to improve their clothing or layette selection skills. In another example, where it is inputted that the device is being used with a premature infant, specific education tailored to those conditions might be administered. If it is determined that the device is constantly being deployed in an environment that is below or above predetermined acceptable environmental limits it may suggest changes need to be made to the sleep environment itself. Education articles may be selected through interrogation of any of the data handled by the device, including ambient conditions, clothing selections, user inputs, external inputs, predictions and forecasts and usage statistics.

An example user interface or display that is not illustrated in FIG. 17 is a thermal resistance alert feature. This feature provides an alert if the room temperature changes outside of range of temperatures mapped to the most recent thermal resistance and displays an alert message to the user. To support this feature the device continues to measure (or otherwise determine) the ambient temperature around the device without performing thermal property assessments. Each new ambient temperature is compared with the range of temperatures mapped to the last recorded thermal property value (or selected garment's thermal property value). When the new ambient temperature is outside the range, the alert (visual, audio, or both) is provided.

Another user interface or display that is not illustrated in FIG. 17 is a database of personalized clothing recommendations. This feature prompts the user to capture an image of a measured garment and records the measured thermal resistance mapped to the image of the clothing article in a database. The next time the room temperature is taken or a new temperature is predicted (e.g., from a weather forecast or the user manually inputting the predicted temperature), the database is searched for a garment of acceptable combinations of garments and sleep sacks having a suitable thermal resistance for that temperature. In one example, the database is constructed externally to the user and contains generic material and/or thermal property information relating to potential material and/or clothing choices. Comparison is then made between the material properties remote database and the predicted, measured or otherwise inputted environmental conditions and subsequent recommendations provided to the user.

Another user interface or display that is not illustrated in FIG. 17 is personalized learning. Personalized learning includes the user recording the thermal resistance of the clothes selected and the room temperature, and then is prompted to enter an experienced quality characteristic (e.g., a rating of the quality of the sleep or perceived comfort, perhaps based on a duration of uninterrupted sleep). A learning algorithm determines correction factors to apply to core the calibration scheme to personalize comfort to baby. This may involve selecting material types that individually captured statistics show result in greater comfort or sleep for the learned baby, or selecting clothing with thermal resistance values that are within safe ranges for the ambient conditions, but tailored to a specific baby. In one example a baby is perceived to sleep better with slightly lower thermal resistance clothing choices and so the system suggests recommendations based on that learning, but still within safe limits. Over time, a new calibration scheme evolves and improves each time used—baby sleep quality is improved and optimized. With more user input the system could also determine sleep clothing type choices, so for example, the baby may typically sleep better in a particular sleep sack, or not like a particular sleep sack (i.e., outliers could be detected and notified to the user). In one example, to effectuate personalized learning, the device's storage medium is adjusted to map the thermal property values to different ranges of environmental characteristic values based on an experienced quality characterization.

Another user interface or display that is not illustrated in FIG. 17 is personalized learning of the babies sleep environment itself. Over time, the device may characterize temperature trends (based on stored usage data) when operated within a given room and may learn patterns which provide input to clothing choice recommendations. In one example, the caregiver selects exactly the right clothing choices for the current room temperature, but the input from the room temperature trend pattern learning software suggests that the room will likely heat up throughout the duration of sleep-time and so the device suggests a clothing choice with lower thermal resistance.

Another user interface or display that is not illustrated in FIG. 17 is quantification of time spent in the "thermoneutral" zone. If a caregiver uses the device to perfectly match clothing choices to the ambient conditions, the infant will be in the thermoneutral zone, meaning the baby expends little or no energy maintaining body temperature, and most calories go to growth and development. By constantly comparing the saved current clothing choice with the ambient conditions, a history of the match can be created which will inform the user of the quality of the baby's comfort (i.e, being in the thermoneutral zone) whether awake or asleep. In one example, it may present a chart showing the amount of time the baby spent within the specified thermoneutral zone, and report a score indicating how close the sleep-time was to 'perfect' (remaining within the zone of thermoneutrality for the entire duration of sleep).

Service Based Garment Recommendations

In one example, a garment recommendation device may be embodied as a communication device with an installed garment recommendation application. The device is capable of receiving a user input that identifies the temperature for which the baby should be dressed. Alternatively, the device could include a temperature sensor configured to provide temperature data to the communication device (e.g., a thermocouple with a communication adaptor). In this example, many of the functions described as being performed by "onboard" components of the measurement device are performed by an internet-based garment recommendation service (e.g., a subscription service).

The garment recommendation device measure (or otherwise determines using any of the methods described above) an environmental characteristic (e.g., temperature, humidity, and so on (hereinafter "temperature")) for which the baby should be dressed. The temperature is transmitted, via the internet, to the garment recommendation service. The service would access a database of recommendations for different temperatures and transmit a recommendation back to the device for display by the device. The recommendations could be in terms of thermal resistance values that are suitable for the temperature, a listing of clothing (previously recorded as owned by the user) that would be suitable for the temperature, material types and/or thicknesses that are suitable for that temperature, different manufacturers' listing of garments that are suitable for that temperature, and so on.

It can be seen from the foregoing description that the described methods, circuitries, and devices provide a household suitable handheld and portable measurement device that determines a thermal property of material and, in some examples, determine and display a suitability of the material for the present environment.

Examples can include subject matter such as a method, means for performing acts or blocks of the method, at least one machine-readable medium including instructions that, when performed by a machine cause the machine to perform acts of the method or of an apparatus or system for measuring a thermal property of a material sample according to embodiments and examples described herein.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. The various illustrative logics, logical blocks, modules, and circuits described in connection with aspects disclosed herein can be implemented or performed with a general purpose processor executing instructions stored in computer readable medium.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. The above description of illustrated embodiments of the subject disclosure is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application. The use of the phrase "one or more of A, B, or C" is intended to include all combinations of A, B, and C, for example A, A and B, A and B and C, B, and so on.

I claim:

1. A measurement device, comprising:
   a portable housing, comprising:
      a first member configured to contact a material sample;
      a measurement system comprising a source element including an electromagnetic radiation source, a speaker, or a vibrator in the first member and a sensor element including a photodiode, a camera, a microphone, or an accelerometer;
      measurement circuitry configured to control the source element and the sensor element to generate data for the material sample, wherein the measurement circuitry is configured to measure a thickness of the material sample such that the data corresponds to the measured thickness; and
      analysis circuitry configured to:
         determine a property of the material sample based on the data; and
         determine information related to the property; and
      an indicia circuitry configured to communicate the information to a user of the measurement device.

2. The measurement device of claim 1, wherein the measurement system is configured to measure a non-thermal property of the material sample.

3. The measurement device of claim 1, wherein the indicia circuitry is disposed in the portable housing.

4. The measurement device of claim 1, wherein:
   the analysis circuitry is configured to transmit the information to a mobile communication device; and
   the indicia circuitry comprises a storage medium storing computer-executable instructions that, when executed by the mobile communication device, cause the mobile communication device to receive the information and display the information on the mobile communication device.

5. The measurement device of claim 1, wherein:
   the source element comprises the electromagnetic radiation source; and
   the sensor element comprises the photodiode.

6. The measurement device of claim 1, wherein:
   the source element comprises the electromagnetic radiation source; and
   the sensor element comprises the camera disposed in a second member and configured to capture an image of a second side of the material sample.

7. The measurement device of claim 1, wherein:
   the source element comprises the speaker; and
   the sensor element comprises the microphone.

8. The measurement device of claim 1, wherein:
   the source element comprises the vibrator; and
   the sensor element comprises the accelerometer.

9. The measurement device of claim 1, wherein the portable housing further comprises:
   a durometer mechanism extending from an outside surface of the portable housing, the durometer mechanism comprising:
      a spring having a predetermined spring constant; and
      a probe disposed at a distal end of the spring;
   durometer measurement circuitry configured to determine durometer data based on a compression of the spring; and
   durometer analysis circuitry configured to determine a surface suitability based on the durometer data and display information related to the surface suitability.

10. The measurement device of claim 1, wherein the measurement system is configured to measure compressibility of the material sample such that the data corresponds to compressibility of the material sample.

11. The measurement device of claim 10, wherein:
    the source element comprises a spring-loaded wide-area contact element configured to deliver a predetermined pressure; and
    the sensor element comprises a displacement measurement device configured to measure a distance that the spring-loaded wide-area contact element extends into the material sample.

12. The measurement device of claim 1, wherein the portable housing further comprises:
    a second member,
    a clamping mechanism connecting the first member to the second member; and
    a handle mechanism configured to control the clamping mechanism to move the first member and the second member between an open position in which the first member and the second member are positioned relatively widely apart from one another and a closed position in which an inside surface of the first member contacts a first side of the material sample and an inside surface of the second member contacts a second side of the material sample opposite the first side.

13. The measurement device of claim 12, wherein the clamping mechanism comprises a relief feature that limits pressure applied to the material sample when the first member and the second member are in the closed position to a predetermined pressure limit.

14. The measurement device of claim 12, wherein one or both of the inside surface of the first member and the inside surface of the second member comprise a gripping feature configured to engage the material sample to maintain the material sample in a fixed position relative to the measurement device.

15. The measurement device of claim 12, wherein the handle mechanism is configured to control the clamping mechanism to move to an extended open position in which the first member and the second member are oriented at approximately 180 degrees to one another.

16. The measurement device of claim 12, wherein the clamping mechanism is configured to maintain an orientation of the inside surface of the first member approximately normal to the inside surface of the second member as the measurement device is moved between the open position and the closed position.

17. The measurement device of claim 12, wherein the sensor element is disposed in the second member.

18. A measurement device, comprising:
    a portable housing, comprising:
       a first member configured to contact a material sample;
       a second member;
       a clamping mechanism connecting the first member to the second member;
       a handle mechanism configured to control the clamping mechanism to move the first member and the second member between an open position in which the first member and the second member are positioned relatively widely apart from one another and a closed position in which an inside surface of the first member contacts a first side of the material sample and an inside surface of the second member contacts a second side of the material sample opposite the first side;
       a measurement system comprising a source element in the first member and a sensor element;

measurement circuitry configured to control the source element and the sensor element to generate data for the material sample; and analysis circuitry comprising a storage medium storing computer-executable instructions that, when executed by a mobile communication device, cause the mobile communication device to:

receive the data from the measurement device;

determine a property of the material sample based on the data;

determine information related to the property; and communicate the information to a user of the measurement device.

19. The measurement device of claim 18, wherein the measurement circuitry is configured to measure a thickness of the material sample such that the data corresponds to the measured thickness.

20. A measurement device, comprising:

a portable housing, comprising:

a first member configured to contact a material sample;

a measurement system comprising a source element in the first member and a sensor element; and an environmental sensor configured to measure a characteristic of an environment surrounding the measurement device;

measurement circuitry configured to control the source element and the sensor element to generate data for the material sample; and control the environmental sensor to generate environmental data; and analysis circuitry configured to determine a property of the material sample based on the data;

determine information corresponding to a suitability of the material sample based on the property and the environmental data; and indicia circuitry configured to communicate the information to a user of the measurement device.

* * * * *